United States Patent
Perkins et al.

(10) Patent No.: US 11,356,496 B2
(45) Date of Patent: *Jun. 7, 2022

(54) SYSTEMS AND METHODS OF PUBLISHING A DESIGN

(71) Applicant: CANVA PTY LTD., Surry Hills (AU)

(72) Inventors: Melanie Joy Perkins, Surry Hills (AU); Toby Patrick Francis Rahilly, Surry Hills (AU)

(73) Assignee: CANVA PTY LTD, Surry Hills (AU)

( * ) Notice: Subject to any disclaimer, the term of this patent is extended or adjusted under 35 U.S.C. 154(b) by 0 days.

This patent is subject to a terminal disclaimer.

(21) Appl. No.: 17/132,148

(22) Filed: Dec. 23, 2020

(65) Prior Publication Data

US 2021/0117610 A1     Apr. 22, 2021

Related U.S. Application Data

(63) Continuation of application No. 16/352,718, filed on Mar. 13, 2019, now Pat. No. 10,909,306.

(Continued)

(51) Int. Cl.
*G06F 17/00* (2019.01)
*H04L 67/02* (2022.01)
(Continued)

(52) U.S. Cl.
CPC .......... *H04L 67/02* (2013.01); *G06F 3/04842* (2013.01); *G06F 9/45558* (2013.01);
(Continued)

(58) Field of Classification Search
CPC ...... G06F 40/14; G06F 40/143; G06F 40/106; G06F 40/186; G06F 16/972; G06F 16/50;
(Continued)

(56) References Cited

U.S. PATENT DOCUMENTS

| 7,072,843 | B2 | 7/2006 | Menninger et al. |
| 7,171,379 | B2 * | 1/2007 | Menninger ............ G06Q 10/06 705/28 |

(Continued)

OTHER PUBLICATIONS

"YouTube Embedded Players and Player Parameters;" YouTube Embedded Players and Player Parameters; YouTube; <https://developers.google.com/youtube/player_parameters>; retrieved Mar. 13, 2019, 19 pages.

(Continued)

*Primary Examiner* — Laurie A Ries
(74) *Attorney, Agent, or Firm* — GrowIP Law Group LLC

(57) ABSTRACT

A method includes storing, at one or more data storage devices, a design in a platform-independent format. The method also includes generating, at a web front end, a GUI including a publish option associated with the design. The method includes sending the GUI to a client device. The method also includes receiving a user request indicating a selection of the publish option, and, in response to receiving the user request, generating first output based on the design, the first output having a HTML format. The method includes identifying a rendering engine based on browser information associated with the client device and generating second output by rendering the first output at the rendering engine, the second output having an image format. The method includes sending the second output to at least one of a data storage device of the data storage devices, a publishing endpoint, or the client device.

16 Claims, 19 Drawing Sheets

Related U.S. Application Data

(60) Provisional application No. 62/644,252, filed on Mar. 16, 2018.

(51) Int. Cl.

| | | |
|---|---|---|
| *G06F 9/455* | (2018.01) | |
| *H04L 41/22* | (2022.01) | |
| *G06F 3/04842* | (2022.01) | |
| *G06F 40/106* | (2020.01) | |
| *G06F 40/143* | (2020.01) | |
| *G06F 40/14* | (2020.01) | |

(52) U.S. Cl.
CPC ............ *G06F 40/106* (2020.01); *G06F 40/14* (2020.01); *G06F 40/143* (2020.01); *H04L 41/22* (2013.01)

(58) Field of Classification Search
CPC .. G06F 9/452; G06F 9/45558; G06F 3/04842; G06T 2200/24; G06T 11/60; H04L 67/02; H04L 41/22; H04L 67/2823
See application file for complete search history.

(56) References Cited

U.S. PATENT DOCUMENTS

| | | | |
|---|---|---|---|
| 7,200,816 | B2 | 4/2007 | Falk et al. |
| 7,574,486 | B1 | 8/2009 | Cheng et al. |
| 10,616,294 | B2 | 4/2020 | Shribman et al. |
| 2003/0069877 | A1* | 4/2003 | Grefenstette ....... G06F 16/3323 |
| 2004/0172484 | A1 | 9/2004 | Hafsteinsson et al. |
| 2006/0173985 | A1* | 8/2006 | Moore ................ G06F 21/6254 709/223 |
| 2007/0174774 | A1 | 7/2007 | Lerman et al. |
| 2009/0144711 | A1* | 6/2009 | Chang ................... G06F 9/5055 717/151 |
| 2010/0333153 | A1 | 12/2010 | Sahota et al. |
| 2011/0078231 | A1* | 3/2011 | Oliver ................... G06F 9/5055 709/203 |
| 2011/0142344 | A1 | 6/2011 | Fukushima |
| 2011/0175923 | A1 | 7/2011 | Mahajan et al. |
| 2013/0103726 | A1 | 4/2013 | Tjin et al. |
| 2015/0039996 | A1* | 2/2015 | Kwon ................... G06F 40/166 715/234 |
| 2015/0088977 | A1 | 3/2015 | Monesson |
| 2015/0113448 | A1 | 4/2015 | Underwood et al. |
| 2016/0103928 | A1 | 4/2016 | Glasgow et al. |
| 2016/0188155 | A1 | 6/2016 | Hunt et al. |
| 2018/0301222 | A1* | 10/2018 | Dew, Sr. ............. G06F 16/9577 |
| 2018/0341688 | A1* | 11/2018 | Ganesh ................ G06Q 10/063 |
| 2019/0065514 | A1 | 2/2019 | Siddiquee et al. |
| 2019/0095258 | A1* | 3/2019 | Chandrasekaran ..... G06F 9/547 |
| 2019/0222619 | A1 | 7/2019 | Shribman et al. |
| 2020/0005523 | A1 | 1/2020 | Brebner |

OTHER PUBLICATIONS

"Embedding;" Instagram Developer Documentation; Instagram; <https://www.instagram.com/developer/embedding/> retrieved Mar. 13, 2019, 3 pages.

"Embedded Tweets;" Overview—Twitter Developers; Twitter; <https://developer.twitter.com/en/docs/twitter-for-websites/embedded-tweets/overview>; retrieved Mar. 13, 2019, 6 pages.

"Embedded Posts;" Embedded Posts—Social Plugins; Facebook; <https://developers.facebook.com/docs/plugins/embedded-posts>; retrieved Mar. 13, 2019, 9 pages.

Cao, Y. et al., "Automatic Stylistic Manga Layout," ACM Trans. on Graphics (Proc. SIGGRAPH Asia 2012), Nov. 2012, vol. 31, Issue 6, ACM, New York, New York, 10 pages.

Garces, E. et al., "A Similarity Measure for Illustration Style," ACM Transactions on Graphics (TOG)—Proceedings of ACM SIGGRAPH 2014, vol. 33 Issue 4, Jul. 2014, 9 pages.

Vollick, I. et al., "Specifying Label Layout Styles by Example," UIST 2007, Oct. 2017, University of California, Berkley, 10 pages.

International Search Report and Written Opinion for PCT Application No. PCT/182019/052103 dated Jun. 18, 2019.

European Patent Application No. 19766656.3, Supplementary European Search Report dated Nov. 3, 2021.

\* cited by examiner

SYSTEMS AND METHODS OF PUBLISHING A DESIGN

CROSS REFERENCE TO RELATED APPLICATIONS

The present application claims the benefit of U.S. Non-Provisional patent application Ser. No. 16/352,718, filed on Mar. 13, 2019, that claims priority to U.S. Provisional Patent Application No. 62/644,252, filed on Mar. 16, 2018 and entitled "SYSTEMS AND METHODS OF PUBLISHING A DESIGN," and the content of each of the foregoing applications is expressly incorporated herein by reference in its entirety.

BACKGROUND

With the proliferation of the internet, there is increasing demand for content available via multiple platforms. Having consistent design for content published across various platforms is a challenge. A number of techniques attempt to have consistent design for content published using a specific platform. For example, stylesheets can be used for designing websites. Platform-specific design tools require user training for each tool. The design has to be recreated using each platform-specific tool. There may be differences in the features that are supported by each platform-specific tool, leading to differences in design of content published across the platforms.

DETAILED DESCRIPTION

Figure 1:
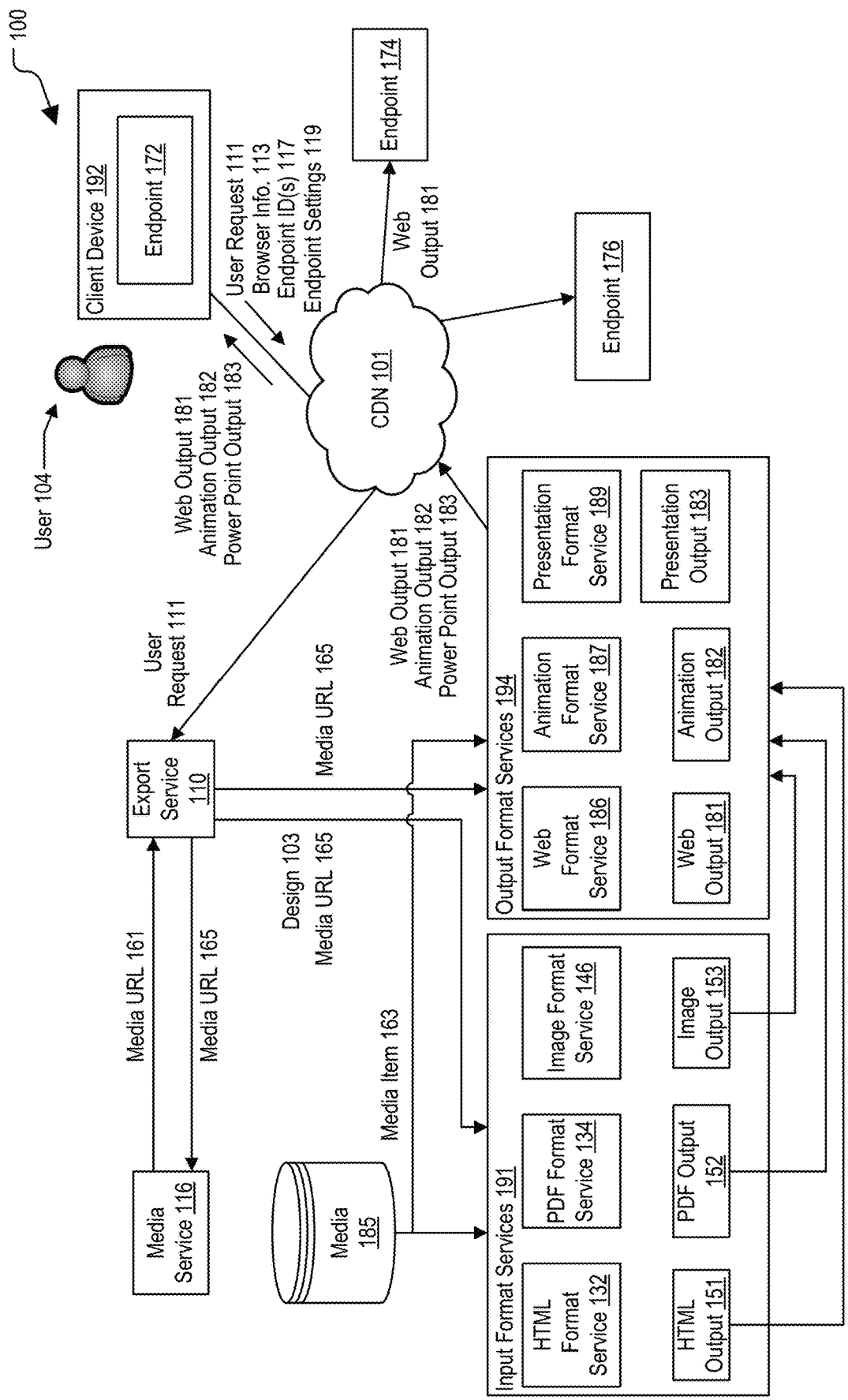
FIG. 1 illustrates a particular example of a system that is operable to publish a design.

Systems and methods of publishing a design are disclosed. As used herein, a "design" may include image content (e.g., in vector format or pixel format), text content, formatting information (e.g., colors, fonts, etc.), etc. In accordance with the described techniques, when a user (who may not be a graphic designer or other visual arts professional) publishes a design for one or more endpoints, one or more outputs may be generated based on the design. A particular output may have a format that corresponds to a particular endpoint. As used herein, an "endpoint" may include a website, a social network site, an application, a client device, or a combination thereof. To illustrate, the user may view the design using a particular browser of a client device. The appearance of the design may be dependent on the particular browser. For example, there may be some differences in the appearance of a font as displayed by a first type of browser as compared to the appearance of the font as displayed by a second type of browser. The differences may occur because of a difference in rendering of the font by the first type of browser compared to rendering of the font by the second type of browser. The outputs may be generated such that the appearance of the design at the endpoints is similar (e.g., identical) to the appearance of the design as displayed in the particular browser used by the user.

It will be appreciated that similar appearance of the design across multiple endpoints (e.g., platforms) as described herein may enable faster design processes and a more intuitive user experience. For example, the user may efficiently maintain consistent platform-independent design without having to generate targeted designs for each platform (or endpoint). Additional illustrative, non-limiting advantages of the present disclosure are described herein.

In the following description, aspects of the present disclosure are described in conjunction with a graphic design website that enables users to create designs using web application(s) or other Software-as-a-service (SaaS) components. Examples of graphic designs include, but are not limited to, social media posts or headers, presentations, letterheads, magazine layouts, certificates, resumes, flyers, book/album covers or art, infographics, flyers, posters, menus, business cards, brochures, logos, greeting cards, postcards, invitations, collages, announcements, blog graphics, Internet advertisements, videos, animations, etc. In some examples, the graphic design website can be accessed by using Internet browsers and/or an application installed on a mobile device, such as a mobile phone or tablet. Unless specified otherwise, reference to the "graphic design website" herein includes the graphic design web application(s)/SaaS component(s) accessible via the graphic design website. Use of the graphic design website to create designs may be faster and/or more convenient than using a standalone downloaded/purchased software program. However, it is to be understood that the description of website-based aspects herein is for illustration only and is not to be considered limiting. In alternative implementations, the techniques of the present disclosure may be applied in the context of a standalone computer application executed on a desktop computer, a laptop computer, a mobile device, etc.

When a user creates a new design on the graphic design website, the user may start with a blank design or may start from a design template that has a pre-applied layout. As used herein, a "layout" includes a default template of images, colors, and/or fonts. For example, the graphic design website may provide access to several "holiday greeting card" layouts, and a user may select one of the layouts as a starting point from which to customize their own holiday greeting card by uploading photos of their own family, entering a personalized greeting message, changing the images/fonts/colors included in the pre-applied layout, etc.

To provide a more comprehensive design experience, the graphic design website may enable the user to search for images, layouts, fonts, etc., as described above. To illustrate, the user may enter the search term "dog" to search for stock images of dogs that can be inserted into a design, pre-existing layouts featuring images and/or text about dogs, previously stored designs (by that user or by other users) featuring dogs, or any combination thereof. Incorporating a search result image (e.g., a photo of a dog) into a design may be as simple as "dragging-and-dropping" the image into the design, at which point the user may be free to edit the image in terms of size, color, etc. Certain media assets (e.g., images, layouts, fonts, etc.) may be free to incorporate into designs while others may be available for a price and may have an associated license (e.g., a one-time-use license) that is enforced by the graphic design website.

The graphic design website may enable the user to publish a design for one or more endpoints. For example, the user may select a publish option to generate outputs corresponding to the endpoints. For example, a first output may correspond to an image (e.g., a joint photographic experts group (JPG) image) of the design. A second output may correspond to a hypertext markup language (HTML) page of the design. A third output may correspond to an audio/visual presentation of the design. A fourth output may correspond to a post of the design on a social network site. A fifth output may correspond to a print design for printing the design on a shirt, a mug, a paper card, a fabric banner, etc.

An illustrative example of a system that supports operation of such a graphic design website and that is operable to publish a design is shown in FIG. 1 and is generally designated 100. The system 100 includes a client device 192 that is communicably coupled, via a content delivery network (CDN) 101, to a computing environment (e.g., a network-accessible cloud computing environment). For example, the client device 192 is communicatively coupled to an export service 110 of the computing environment. Although FIG. 1 shows a CDN 101, it is to be understood that in alternative aspects devices shown in FIG. 1 may communicate using one or more networks (or portions thereof) that include but are not limited to CDN(s), private network(s), cellular network(s), the Internet, etc. The client device 192 is configured to be operated by a user 104. As further described herein, the system 100 may enable the user 104 to quickly and easily create and edit various forms of graphic designs and other visual media works, even if the user 104 is not a trained graphic designer or other visual arts professional. In some examples, the computing environment includes one or more servers and/or one or more databases, data stores, and/or data storage devices. For example, the computing environment includes a media database 185. The computing environment may include additional databases, such as a document database, an export database, or both. The computing environment may include one or more load balancers, as further described with reference to FIG. 17.

In particular aspects, the client device 192 corresponds to a desktop computer, a laptop computer, a mobile phone, a tablet, or other computing device configured to access websites via the Internet. The client device 192 may include (or may be connected to) one or more input devices (e.g., a keyboard, a mouse, a touchscreen, etc.) and one or more output devices (e.g., a monitor, a touchscreen, audio speakers, a headphone connection, etc.).

In particular aspects, the client device 192, the computing environment, the one or more servers, the document database, the media database 185, the export database, the load balancers, or a combination thereof may include one or more processors or processing logic, memories, and/or network interfaces. The memories may include instructions executable by the processors to perform various functions as described herein. The network interfaces may include wired and/or wireless interfaces operable to enable communication to local area networks (LANs) and/or wide area networks (WANs), such as the Internet.

A first server may be configured to execute a web front end. The web front end is configured to serve a graphic design website to requestors. For example, the web front end may send one or more graphical user interfaces to the client device 192 in response to receiving a request from the client device 192. The same or a different (e.g., second) server may be configured to execute an export service 110. The export service 110 may support graphic design export tasks (e.g., publishing a design as one or more outputs).

The computing environment supports one or more services configured to generate outputs having particular formats. For example, supported formats may include a HTML format, an image format, a presentation (e.g., PowerPoint® (a registered trademark of Microsoft Corp., Redmond, Wash.)) format, a portable document format (PDF), a web format, an animation format, a social network post format, a print design format, one or more additional formats, or a combination thereof. To illustrate, the computing environment may be configured to execute one or more format services corresponding to the particular formats. The computing environment includes one or more input format services 191. In FIG. 1, the input format services 191 include a HTML format service 132, a PDF format service 134, and an image format service 146. The HTML format service 132 is configured to convert the design 103 to an HTML output 151 having a HTML format. The PDF format service 134 is configured to convert the design 103 to a PDF output 152 having a PDF format. The image format service 146 is configured to convert the design 103 to an image output 153 having an image format.

The export service 110 may be communicatively coupled to one or more output format services 194. In FIG. 1, the output format services 194 include a web format service 186, an animation format service 187, and a presentation format service 189. The web format service 186 is configured to generate a web output 181 (e.g., a website), as further described with reference to FIG. 13. The animation format service 187 is configured to generate an animation output 182 having an animation format, as further described with reference to FIG. 12. The presentation format service 189 is configured to generate a presentation output 183 having a PowerPoint® format, as further described with reference to FIG. 3.

It should be understood that the HTML format service 132, the PDF format service 134, and the image format service 146 are described as illustrative examples of the input format services 191. In some implementations, the input format services 191 may include more, fewer, or different services.

It should be understood that the web format service 186, the animation format service 187, and the presentation format service 189 are described as illustrative examples of the output format services 194. In some implementations, the output format services 194 may include more, fewer, or different services.

Each particular input format service is configured to convert a design to an output having a corresponding format. For example, the HTML format service 132 is configured to convert a design to an HTML output having an HTML format. The PDF format service 134 is configured to convert a design to a PDF output having a PDF format. The image format service 146 is configured to convert a design to an image output having an image format (e.g., JPG, Portable Network Graphics (PNG), etc.).

Each particular output format service is configured to convert an input having a supported input format to an output having a particular format. For example, the web format service 186 is configured to convert an input to a web output having a web format (e.g., a social network post format). The web format service 186 may support input formats including an HTML format, a PDF format, an image format, another input format, or a combination thereof. The animation format service 187 is configured to convert an input to an animation output having an animation format (e.g., graphics interchange format (GIF) or a video format). The animation format service 187 may support input formats including an HTML format, a PDF format, an image format, another input format, or a combination thereof. The presentation format service 189 is configured to convert an input to a presentation output. The presentation format service 189 may support input formats including an HTML format, a PDF format, an image format, another input format, or a combination thereof.

The computing environment may include one or more servers configured to execute the input format services 191. For example, a third server may execute the HTML format service 132 and the PDF format service 134, and a fourth server may execute the image format service 146. In a particular aspect, the computing environment may include one or more servers configured to execute one or more of the output format services 194. For example, the third server may execute the web format service 186 and a fifth server may execute the animation format service 187. In a particular aspect, a second computing environment external to the computing environment may execute one or more of the output format services 194. For example, a second computing environment executes the presentation format service 189. In a particular aspect, some formatting services may be "native" while others may be created by third parties. Services created by third parties may use one or more of the native services as building blocks. Third party services may be based on (e.g., use) application program interfaces (APIs) of native services exposed by a provider of the design website. It should be understood that allocations of format services to particular servers as described herein are provided as illustrative examples, and are not limiting.

The load balancers may be configured to send a message to a server requesting instantiation of a particular service. The server may execute a virtual machine including an instance of the particular service. For example, the load balancers may be configured to send a message to the third server to instantiate the HTML format service 132. The third server may, in response to receiving the message, execute a virtual machine including an instance of the HTML format service 132. In a particular aspect, multiple servers may execute instances of the same service. For example, the load balancers may send a second message to the fourth server to instantiate the HTML format service 132. In this example, the third server may execute a first virtual machine executing a first instance of the HTML format service 132 and the fourth server may execute a second virtual machine including a second instance of the HTML format service 132.

The export service 110, the output format services 194, or a combination thereof, may be coupled to one or more endpoints. In FIG. 1, the export service 110, the output format services 194, or a combination thereof may be coupled, via the CDN 101, to an endpoint 172, an endpoint 174, an endpoint 176, one or more additional endpoints, or a combination thereof. An "endpoint" may also be included in the client device 192. For example, the client device 192 may include the endpoint 172. An endpoint may refer to an application, a server, a social network site, a website, a device, or a combination thereof.

During operation, the user 104 may operate the client device 192 to access a graphic design website via the computing environment. The graphic design website may enable the user to create and modify a design 103 (which may be persisted to the document database) using web application(s) and/or Software-as-a-service components presented by the graphic design website. For example, the web front end may generate a graphical user interface (GUI) of the graphic design website. The GUI includes a publish option to publish the design 103. The GUI may include one or more options to edit the design 103. The GUI may include a display portion that displays the design 103. In various aspects, the GUI may enable at least any graphic design function that is generally found in a standalone graphic design application, although it is to be appreciated that the GUI may enable other functionality as well.

In a particular aspect, the GUI enables publishing the design 103, as further described with reference to FIGS. 2-16. For example, the user 104 may select the publish option and at least one of the endpoint 172, the endpoint 174, or the endpoint 176. The user 104 may also select one or more endpoint settings 119 associated with the selected endpoints. For example, the endpoint ID(s) 117 may include an identifier of the endpoint 174, the endpoint 174 may correspond to a website, and the endpoint settings 119 may include a title for the website, a domain name for the website, or both, as further described with reference to FIG. 13. The client device 192 may send a user request 111 to the computing environment in response to receiving a user selection of the publish option. In a particular aspect, the user request 111 includes one or more endpoint identifier(s) (ID(s)) 117 of the selected endpoints (e.g., at least one of the endpoint 172, the endpoint 174, or the endpoint 176), the endpoint settings 119, or a combination thereof. In a particular aspect, the client device 192 sends the endpoint ID(s) 117, the endpoint settings 119, or a combination thereof, concurrently with the user request 111 to the computing environment.

The client device 192 may send, to the computing environment, browser information 113 of a browser used by the client device 192 to display the GUI. In a particular aspect, the user request 111 includes the browser information 113. In a particular aspect, the client device 192 sends the browser information 113 concurrently with the user request 111 to the computing environment. The browser information 113 may indicate a type of the browser, a version of the browser, a type of a HTML rendering engine, a version of the HTML rendering engine, information regarding a computing device executing the browser, or a combination thereof. In some aspects, the browser information 113 is received from the client device 192 before the user request 111. For example, the browser information 113 may be provided by the client device 192 when the client device 192 initially connects to the web front end. In some aspects, the browser information 113 is a header field or metadata (e.g., a user agent string) that is included in some or all messages from the client device 192 to elements of the computing environment. Although various descriptions herein reference browser information, it is to be understood that as used herein, "browser information" may include various types of information about the client device 192 (e.g., information regarding make/model, operating system, browser version, version of a browser plug-in or another application, etc.).

The export service 110 may, in response to receiving the user request 111, identify one or more endpoints, such as the endpoint 172, the endpoint 174, the endpoint 176, or a combination thereof, corresponding to the endpoint ID(s) 117. The export service 110 may generate (or update) configuration data to indicate the identified endpoints, such as at least one of the endpoint 172, the endpoint 174, or the endpoint 176, the endpoint settings 119 associated with the identified endpoints, or a combination thereof. The export service 110 may store the configuration data in the export database. The configuration data may be associated with a user account of the user 104.

In a particular aspect, the graphic design website may enable editing of at least a portion of the configuration data independently of the user request 111. For example, the GUI may include a configuration update option. The web front end may send a second GUI to the client device 192 in response to receiving a user selection of the configuration update option. The user 104 may edit (e.g., update) one or more fields of the second GUI. The web front end may update the configuration data based on the values of one or more fields of the second GUI.

In a particular aspect, the client device 192 refrains from sending the endpoint ID(s) 117, the endpoint settings 119, or both. In a particular aspect, the publish option corresponds to a "publish as usual" option. In this aspect, the export service 110, in response to receiving the user request 111 and determining that the endpoint ID(s) 117 have not been received within a threshold duration of receiving the user request 111, retrieves the endpoint ID(s) 117, the endpoint settings 119, or a combination thereof, from the configuration data.

In a particular aspect, the export service 110 retrieves the endpoint settings 119 from the configuration data in response to receiving the endpoint ID(s) 117 and determining that the endpoint settings 119 have not been received within a threshold duration of receiving the endpoint ID(s) 117. In a particular aspect, the publish option corresponds to a "publish all" option. In this aspect, the export service 110, in response to receiving the user request 111 and determining that the endpoint ID(s) 117 have not been received within a threshold duration of receiving the user request 111, retrieves the endpoint ID(s) 117, the endpoint settings 119, or a combination thereof, from the configuration data. In this aspect, the endpoint ID(s) 117, the endpoint settings 119, or a combination thereof, may correspond to each of the endpoint 172, the endpoint 174, and the endpoint 176 (e.g., all supported endpoints).

The export service 110 identifies one or more selected endpoints corresponding to the endpoint ID(s) 117. For example, the export service 110, in response to determining that the endpoint ID(s) 117 includes an identifier of the endpoint 172, determines that the selected endpoints include the endpoint 172.

The export service 110 identifies (e.g., selects) one or more format services corresponding to the selected endpoints, as further described with reference to FIGS. 2-16. For example, the export service 110 identifies an output format service that corresponds to a selected endpoint. In a particular aspect, the export service 110 identifies the output format service based on mapping data. For example, the export service 110 may select the web format service 186 in response to determining that the selected endpoints include the endpoint 174 that corresponds to a website and/or that the mapping data indicates that the web format service 186 is mapped to web site/webpage endpoints. In a particular aspect, the mapping data includes default data, data received from one or more of the output format services 194, data received from one or more of the input format services 191, a portion of the user request 111, user input, configuration input, or a combination thereof. In a particular aspect, a user may provide configuration input to the export service 110 indicating that the web format service 186 corresponds to a website endpoint. In response, the export service 110 may generate (or update) the mapping data indicating that a website endpoint maps to the web format service 186.

The export service 110 determines one or more input formats supported by the identified output format service. For example, the export service 110 sends a request to the web format service 186 and receives a response from the web format service 186 indicating that the web format service 186 supports the one or more input formats. In a particular aspect, the export service 110 may determine that the configuration data indicates that the web format service 186 supports the one or more input formats. In a particular example, the export service 110 determines that the web format service 186 supports an HTML format, an image format, or both.

The export service 110 identifies one or more of the input format services 191 that correspond to the one or more input formats supported by the identified output format service. For example, the export service 110 identifies the HTML format service 132 corresponding to the HTML format and the image format service 146 corresponding to the image format. The export service 110 selects one of the identified input format services. For example, the export service 110 selects the HTML format service 132. In a particular aspect, the export service 110 selects the HTML format service 132 based on preference data. The preference data may indicate that the HTML format service 132 has higher preference than the image format service 146 for the web format service 186. Similarly, when the endpoint ID(s) 117 identify multiple endpoints, the export service 110 may identify a second output format service corresponding to a second endpoint of the multiple endpoints and may identify a second input format service corresponding to the second output format service. For example, when the endpoint ID(s) 117 identify the endpoint 172 (e.g., a PowerPoint® application), the export service 110 may identify the presentation format service 189 as corresponding to the endpoint 172 and may identify the image format service 146 as corresponding to the presentation format service 189.

The export service 110 sends requests to various format services depending on which endpoints have been selected by a user for publication of the design 103. For example, the export service 110 may send a first request to the HTML format service 132, a second request to the image format service 146, or both. Each of the requests may identify the design 103. For example, each of the requests may include a unique identifier of the design 103, a uniform resource locator (URL) or file path of the design 103, a memory/storage address at which the design 103 is accessible, etc.

A request to a particular format service may indicate the corresponding endpoint, endpoint settings associated with the corresponding endpoint, or a combination thereof. To illustrate, the first request to the HTML format service 132 may indicate that the first request is associated with the endpoint 174 and may indicate a first subset (e.g., a title, a domain name, or both) of the endpoint settings 119 that correspond to the endpoint 174 (e.g., a website). The second request to the image format service 146 may indicate that the second request is associated with the endpoint 172 and may indicate a second subset of the endpoint settings 119 (e.g., a password option) that correspond to the endpoint 172 (e.g., a PowerPoint® application). In a particular aspect, the export service 110 adds the first request, the second request, or both, to one or more messages queues.

One or more of the format services may concurrently process the requests. For example, the HTML format service 132 may process the first request concurrently with the image format service 146 processing the second request. Having requests processed concurrently may be faster than having the requests processed sequentially (e.g., by a single service).

In a particular aspect, the load balancers, in response to determining that the message queues include the first request for the HTML format service 132, send a message to the third server to instantiate the HTML format service 132. The load balancers may select the third server for instantiating the HTML format service 132 based on various criteria. For example, the load balancers may select the third server in response to determining that the third server is next on a list of available servers, that a load of the third server is less than a first load threshold, that a load of another server executing another instance of the HTML format service 132 is greater than a second load threshold, that no servers are executing the HTML format service 132, or a combination thereof. A load of the third server may be based on a number of requests for the third server in the message queues, a number of requests being processed by the third server, or a combination thereof. The third server may instantiate the HTML format service 132 in response to receiving the message from the load balancers. The criteria used by the load balancers to select a server to instantiate a service may be programmable, e.g., by an information technology (IT) professional associated with the computing environment. The computing environment may thus support operational characteristics (e.g., a number of executing services) that can be configured based on programmable criteria. In some aspects, the load balancers determine whether to request instantiation of a format service based on whether one or more instances of the format service are already executing, a load of the one or more instances of the format services, or a combination thereof. For example, if HTML publishing has been occurring fairly regularly, one or more HTML format services may already be instantiated at the time the first request is made, and the load balancers may assign the first request to one of those already-instantiated HTML format services.

The HTML format service 132 may receive the first request from the export service 110. For example, the HTML format service 132 may retrieve the first request from the message queues. The HTML format service 132 may, in response to determining that the first request includes an identifier of the design 103, retrieve the design 103 from the document database. The design 103 may have a platform-independent format, such as a JavaScript® (a registered trademark of Sun Microsystems, Inc., Redwood Shores, Calif.) object notation (JSON) format. The design 103 may be represented by one or more key-value pairs.

The HTML format service 132 may generate the HTML output 151 having an HTML format by converting the key-value pairs representative of the design 103 to HTML elements. For example, a first key-value pair may indicate that the design 103 includes a media item 163 (e.g., an image). To illustrate, the first key-value pair may indicate an identifier of the media item 163. The HTML format service 132 may generate the HTML output 151 including an HTML element (e.g., an HTML tag) for the media item 163. For example, the HTML element may be an image tag and may include the identifier of the media item 163 (e.g., <img src="identifier">).

In a particular aspect, the design 103 may include a compressed representation of the particular image. For example, the first key-value pair may include an identifier of the particular image. The particular image may be retrievable from the media database 185 using the identifier (e.g., an address or a network accessible link). In a particular aspect, multiple designs corresponding to multiple users may include the identifier of the particular image. Designs may typically be made of multiple foreground/background components, and therefore including the identifier of an image in the design 103, instead of the image itself, may reduce a memory footprint of the design 103. Moreover, overall memory usage may be reduced by storing fewer copies (e.g., a single copy) of an image as compared to storing multiple copies of the image (e.g., a copy in each design that uses the image).

In a particular implementation, the HTML format service 132 may send a first media URL request to the export service 110 requesting a media URL corresponding to the identifier of the media item 163. The export service 110 may, in response to receiving the first media URL request, send a second media URL request to the media service 116 requesting the media URL. The first media URL request, the second media URL request, or both, may indicate a user account associated with the user 104. The first media URL request, the second media URL request, or both, may indicate one or more media characteristics (e.g., a minimum size, a maximum size, a minimum resolution, a maximum resolution, or a combination thereof) supported or requested by the HTML format service 132. In a particular aspect, the media characteristics may be based on the first subset of endpoint settings associated with the endpoint 174.

The media service 116 may provide a media URL 161 to the export service 110 responsive to receiving the second media URL request. For example, the media database 185 may include multiple versions of the media item 163 that differ from each other in terms of size, resolution, watermarking, or a combination thereof. The media service 116 may select a version of the media item 163. For example, the media service 116 may select a version of the media item 163 that is available (e.g., has been purchased) for the user account of the user 104, that satisfies the media characteristics indicated by the second media URL request, or a combination thereof. The export service 110 may provide a media URL 165 to the HTML format service 132.

In a particular aspect, the media URL 165 may be the same as the media URL 161. In an alternative aspect, the media URL 165 may be a time-limited version of the media URL 161. For example, the export service 110 may determine, at a first time, an expiration time based on an URL validity duration (e.g., expiration time=first time+URL validity duration). The export service 110 may generate the media URL 165. The export service 110 may provide the media URL 165 to the media service 116 indicating that the media URL 165 is to refer to the same version of the media item 163 as the media URL 161 and that the media URL 165 is to expire at the expiration time. The media service 116 is configured to determine, based on whether the media URL 165 has expired, whether to provide the version of the media item 163 in response to receiving a request indicating the media URL 165. For example, the media service 116 may be configured to determine, at a second time, that the media URL 165 has not expired in response to determining that the second time is less than the expiration time. The media service 116 may be configured to provide the version of the media item 163 in response to receiving the request indicating the media URL 165 and determining that the media URL 165 has not expired. Alternatively, the media service 116 may be configured to determine, at the second time, that the media URL 165 has expired in response to determining that the second time is greater than or equal to the expiration time. The media service 116 may be configured to refrain from providing the version of the media item 163 in response to receiving the request indicating the media URL 165 and determining that the media URL 165 has expired. The HTML format service 132 may generate the HTML output 151 including an HTML element (e.g., an HTML tag) for the media item 163. For example, the HTML element may be an image tag and may include the media URL 165 (e.g., <img src=media URL 165>).

In a particular aspect, the HTML format service 132 may update the HTML output 151 based on the subset of the endpoint settings 119 that correspond to the endpoint 174. For example, the HTML format service 132 may update the HTML output 151 to include an HTML element (e.g., "<title>title</title>") corresponding to one or more end point settings (e.g., title) of the subset of the endpoint settings 119.

The HTML format service 132 may store the HTML output 151 in the export database. The HTML format service 132 may provide an indication (e.g., the identifier of the HTML output 151) to the export service 110 that processing of the first request is complete. The export service 110, in response to receiving the indication, determines that the first request is associated with the endpoint 174 and sends a request to the corresponding output service. For example, the export service 110, in response to receiving the indication, sends a third request to the web format service 186. The third request indicates the HTML output 151. For example, the third request includes the HTML output 151 or includes an identifier (e.g., a URL) of the HTML output 151. The third request may indicate that it is associated with the endpoint 174, may indicate the first subset of the endpoint settings 119 corresponding to the endpoint 174, or a combination thereof.

The web format service 186 may, in response to receiving the third request, generate the web output 181 based on the HTML output 151, the first subset of the endpoint settings 119 corresponding to the endpoint 174, or a combination thereof. In a particular example, the endpoint 174 may correspond to a website. The web output 181 may include a first version of the website generated for presentation on larger/landscape display devices, such as desktop monitors, laptop computers, presentation screens, tablet computers, etc. The web output 181 may include a second version of the website for presentation on smaller/portrait display devices, such as mobile telephones or personal digital assistants. Additional versions may also be generated (e.g., for wearable devices having display screens).

In a particular aspect, the HTML output 151 includes the media URL 165 (e.g., a time-limited URL). In a particular aspect, the export service 110 generates the media URL 165 (e.g., a time-limited URL) corresponding to the media URL 161 in response to determining that the HTML output 151 includes the media URL 161, the design 103 includes the media URL 161, or both. The export service 110 provides the media URL 165 to the output format services 194. For example, the export service 110 provides the media URL 165 concurrently with the third request to the web format service 186.

The web format service 186 sends a media request to the media service 116 indicating the media URL 165. The media service 116, in response to receiving the media request and determining that media URL 165 has not expired, provides the corresponding version of the media item 163 to the web format service 186. The web format service 186 provides the web output 181 (or an identifier of the web output 181) to the export service 110, the client device 192, the endpoint 174 (e.g., a website), or a combination thereof. In a particular aspect, the web output 181 may include the version of the media item 163 corresponding to the media URL 165. In a particular aspect, the web format service 186 may store the version of the media item 163 and include a particular identifier (e.g., a second URL) of the version of the media item 163 in the web output 181. In a particular aspect, the web format service 186 may provide the version of the media item 163 concurrently with the web output 181 (or the identifier of the web output 181) to the export service 110, the client device 192, the endpoint 174, or a combination thereof. In a particular aspect, the export service 110 may store the web output 181, the identifier of the web output 181, the version of the media item 163, the media URL 165, the particular identifier (e.g., the second URL) of the version of the media item 163, or a combination thereof, in the export database. The export service 110 may provide the web output 181, the identifier of the web output 181, the version of the media item 163, the media URL 165, the particular identifier (e.g., the second URL) of the version of the media item 163, or a combination thereof, to the client device 192, the endpoint 174, or both.

In a particular aspect, the web format service 186 (or the export service 110) may provide, to the endpoint 174, the first subset of the endpoint settings 119 that correspond to the endpoint 174. For example, the first subset of the endpoint settings 119 may include authorization data, such as a username, a password, an authentication token, or a combination thereof. The web format service 186 (or the export service 110) may provide the authorization data to the endpoint 174 concurrently with providing the web output 181 to the endpoint 174.

In a particular aspect, publishing the design 103 may include executing a single format service. To illustrate, the mapping data may indicate publishing the design 103 to a particular endpoint involves a single format service that is configured to convert the design 103 to an output having a particular format that corresponds to the particular endpoint. The single format service may be one of the input format services 191, one of the output format services 194, or both.

In a particular aspect, publishing the design 103 may include daisy-chaining multiple format services. To illustrate, the mapping data may indicate publishing the design 103 to a particular endpoint involves a sequence of multiple format services, e.g., providing the design 103 to a first format service of the input format services 191, providing an output of the first format service to a second format service, providing an output of the second format service to a third format service of the output format services 194, and providing an output of the third format service to the particular endpoint. The sequence of format services may include one or more additional format services (e.g., of the output format services 194) when there is a mismatch between output formats supported by the input format services 191 and input formats supported by a format service corresponding to the particular end point.

A particular service may be both an input format service and an output format service. For example, the input format services 191 may include the HTML format service 132 because the HTML format service 132 is configured to convert the design 103 from a platform-independent format to the HTML output 151. Additionally, or in the alternative, the output format services 194 may include the HTML format service 132 because the HTML format service 132 is configured to convert an input to the HTML output 151. The HTML format service 132 may support input formats including the platform-independent format, one or more additional input formats, or a combination thereof.

In a particular aspect, the same format service may perform multiple stages of processing. For example, the sequence of format services for a particular publishing endpoint may include a daisy-chain from the HTML format service 132 to the image format service 146 and then back to the HTML format service 132.

In a particular publishing sequence in which the image format service 146 is daisy-chained behind the HTML format service 132, the HTML format service 132 may provide an indication (e.g., an identifier of the HTML output 151) to the export service 110 that processing of a first request is complete. In response, the export service 110 may send a second request to the image format service 146. The second request may indicate the HTML output 151, the browser information 113, or both.

The image format service 146 may, in response to receiving the second request, use various techniques for converting the HTML output 151 to the image output 153. For example, the image format service 146 may generate a rendered output (e.g., a render tree or a painted render tree) by rendering the HTML output 151, or a portion thereof, based on the browser information 113 and may generate the image output 153 corresponding to the rendered output. The browser information 113 may indicate a browser type, a browser version, a HTML rendering engine type, a HTML rendering engine version, information regarding a computing device executing the browser, or a combination thereof. The image format service 146 may generate the rendered output by rendering the HTML output 151 using a HTML rendering engine of the HTML rendering engine type, the HTML rendering engine version, or both, of a browser corresponding to the browser type, the browser version, or both. The rendered output may indicate how the HTML output 151 is to be displayed at a display device. The image format service 146 may generate the image output 153 based on the rendered output. The image output 153 may represent an image of the HTML output 151 as rendered by the HTML rendering engine, as displayed by the browser, or both. The image format service 146 may store the image output 153 in the export database. The image format service 146 may provide an indication to the export service 110 that processing of the second request is complete.

It will be appreciated that the HTML format service 132 and the image format service 146 may overcome issues that may arise due to inconsistencies in browser software, plug-in software, device displays, etc. To illustrate, the design 103 may look slightly different when displayed on different client device makes/models, different browser types or versions, different operating system types or versions, different browser plug-in (or other software) types or versions, etc. However, when the user 104 requests publication of the design 103 from the client device 192, the system 100 may assume that the user 104 expects the published version(s) of the design 103 to look identical to what the user sees at the client device 192. By generating publishing output using rendering engine(s) that are selected and/or instantiated in view of the browser information 113, the system 100 may establish the same (or as close as possible) client computing environment to the one in which the user 104 sees and requests publication of the design 103. Doing so may mitigate design rendering issues stemming from hardware/software inconsistencies in different client computing environments. Were the browser information 113 not used, the user may receive a publish output that differs in some or many ways from what the user sees on their computing device and what the user saw when creating the design. The techniques of the present disclosure advantageously override such behavior. In a particular embodiment, rendering engine(s) executed at the computing environment correspond to a headless browser, i.e., a "behind-the-scenes" browser instance that is used to retrieve, render, or provide input to webpages without display of a GUI. Multiple such headless rendering engines may be in operation at a given time in a system that receives multiple concurrent publish requests from different browsers (e.g., being operated by different users).

If the HTML format service 132 is daisy-chained behind the image format service 146, the export service 110 may send a third request to the HTML format service 132 in response to completion of publishing tasks(s) by the image format service 146. The third request may indicate the image output 153 (or an identifier that can be used to access the image output 153). The HTML format service 132 may generate second HTML output in response to receiving the third request. For example, the second HTML output may include an HTML element (e.g., <img src="identifier of the image output 153">) corresponding to the image output 153. The HTML format service 132 may store the second HTML output in the export database. The HTML format service 132 may provide an indication (e.g., an identifier of the second HTML output) to the export service 110 that processing of the third request is complete. The export service 110 may send a fourth particular request to the web format service 186. The fourth particular request may include the second HTML output (or an identifier of the second HTML output). The web format service 186 may generate the web output 181 based on the second HTML output. The web format service 186 may provide an indication to the export service 110 that processing of the fourth request is complete. The export service 110 may provide the web output 181 to the client device 192, the endpoint 174 (e.g., a website), or both. In an alternate aspect, the web format service 186 provides the web output 181 (or an identifier of the web output 181) to the client device 192, the endpoint 174 (or a website server configured to host the endpoint 174), or both. For example, the fourth request may indicate that the web format service 186 is to provide the web output 181 to the client device 192, to the endpoint 174, or both.

In a particular aspect, the endpoint ID(s) 117 identify multiple endpoints, such as the endpoint 174 and the endpoint 176. If the endpoints 174, 176 map to the same sequence of format services, the export service 110 may perform the sequence of processing for a single endpoint (e.g., the endpoint 174) and provide the processed output to multiple endpoints. To illustrate, the export service 110 may send the web output 181 to both the endpoint 174 and the endpoint 176. Multiple endpoints may thus access the same copy of the web output 181 or other publishing output. Generating and/or storing a single copy of publishing output may conserve memory resources as compared to storing multiple copies of publishing output (e.g., one copy for each endpoint or each time the output is requested).

In a particular aspect, the endpoint settings 119 include settings associated with multiple endpoints. In this example, the web output 181 may be based on endpoint settings that match across the multiple endpoints. To illustrate, the title of publishing output may match across multiple endpoints. Endpoint settings that do not match across the multiple endpoints may be provided to individual endpoints along with publishing output.

In a particular aspect, the mapping data may indicate different processing sequences for different endpoints. To illustrate, the sequence of format service(s) that are used to publish to a presentation application may be different than the sequence of format service(s) that are used to publish to a website or to an image file. In some examples, a presentation format service is used to generate a slideshow file to publish to a presentation application. In some aspects, publishing output that is sent to a client device (e.g., the client device 192) is sent as a compressed package or file.

In some aspects mapping data specifying an entire sequence of format service(s) corresponding to a particular endpoint may be stored in memory. In other aspects, the export service 110 may determine various portions of a sequence of format service(s) without having the entire sequence specified in a single location. In these aspects, the mapping data may correspond to various pieces of information accessible to and/or determined by the export service 110. For example, the export service 110 may determine that the mapping data indicates that a particular sequence of format services corresponding to the endpoint 174 includes the web format service 186, in response to determining that first service data indicates that the web format service 186 is configured to generate output having an output format that is associated with the endpoint 174 or with an endpoint type (e.g., a website) of the endpoint 174. The export service 110 may determine that the mapping data indicates that the sequence of format services includes the HTML format service 132 prior to the web format service 186, in response to determining that second service data indicates that the web format service 186 supports a first input format (e.g., the HTML format) and that third service data indicates that the HTML format service 132 is configured to generate an output having the first input format. The mapping data may include the first service data, the second service data, and the third service data.

The system 100 may support publishing of designs that are free of cost as well as publishing of designs that include media items having a publishing cost. The GUI may indicate a cost of publishing the design 103. To illustrate, a first media item (e.g., a foreground or background image or font) that is used in the design 103 may have a one-time cost of $1.00, after which the first media item can be used in unlimited fashion by the user 104. A second media item (e.g., another foreground or background image or font) may have a per-use cost of $0.50. In this example, if the design 103 is published to N endpoints (where N is an integer greater than zero), the publication cost of the design 103 would be at least $1.00+(N*$0.50).

The export service 110 may send a request to a billing service of the computing environment to charge an account of the user 104 for the publishing cost(s) of media item(s) included in the design 103. In a particular example, the GUI may include options to enter payment information. The client device 192 may send the payment information to the billing service for payment of the publishing cost of the design 103.

The system 100 may thus enable using a single platform-independent design (e.g., the design 103) to generate publishing outputs having a similar look-and-feel for multiple platforms (e.g., endpoints), including using specifically selected rendering engine(s) to replicate the look-and-feel seen by the user 104 at the client device 192 from which a publishing request is received. A single update to the platform-independent design (e.g., the design 103) may thus effect a one-to-many change for the multiple platforms. The one-to-many change significantly reduces effort as compared to updating individual platform-specific designs for each of the multiple platforms. A memory footprint of the design 103 may be reduced by having the design 103 include a reference to a media item (e.g., an image) stored in the media database 185 (as compared to including the media item itself). In a particular aspect, use of memory resources (e.g., redundancy) may be reduced by having multiple designs corresponding to multiple users referring to the same copy of the media item (as compared to storing multiple copies of the media item in the media database 185). A size of an output corresponding to the design 103 may be reduced by including the reference to the media item (e.g., the image) in the output (as compared to including the media item itself).

FIGS. 2-16 illustrate examples of publishing the design 103 by providing input to a GUI, which may be generated by the system 100 (e.g., a web front end) of FIG. 1.

Figure 2:
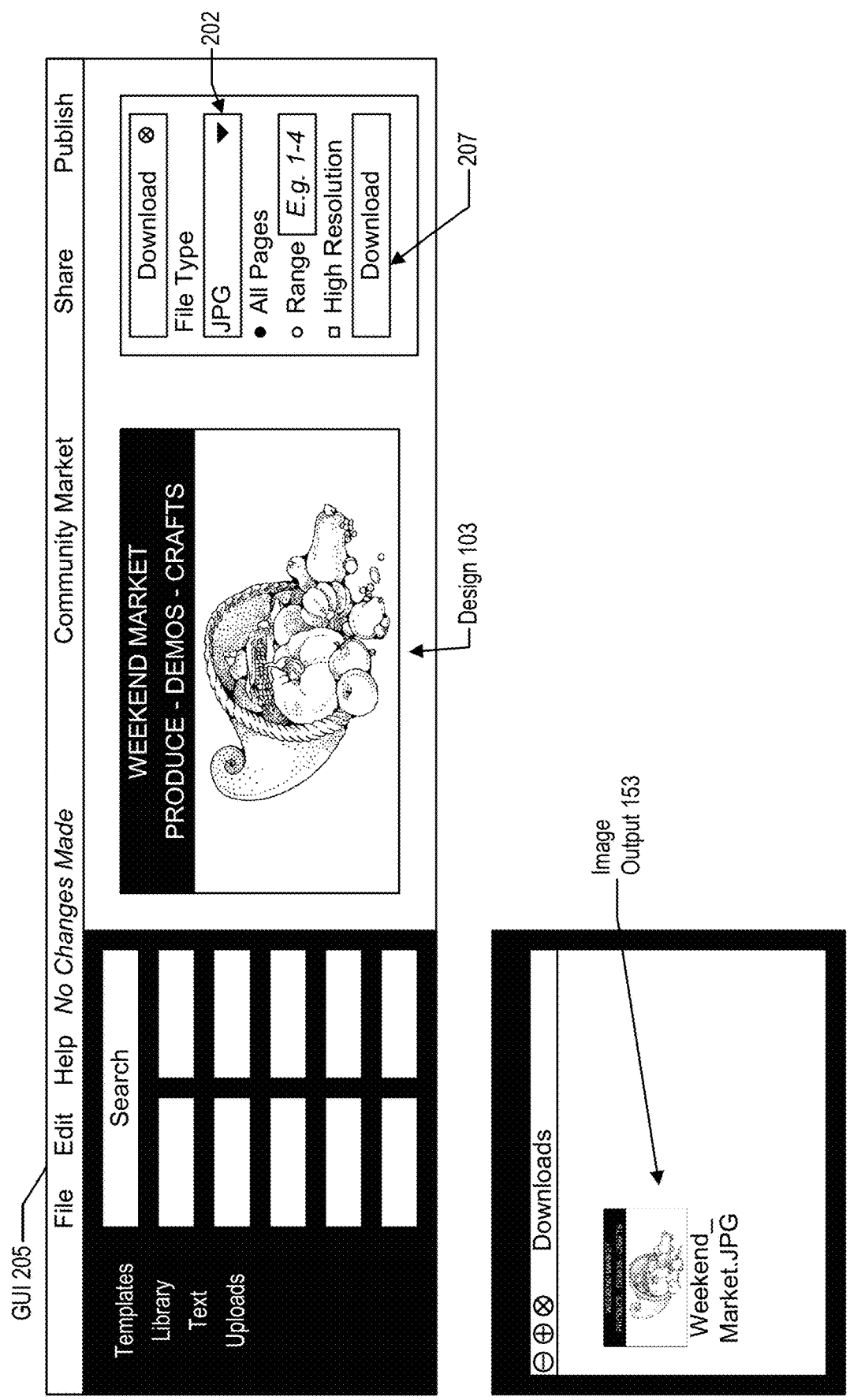
FIG. 2 illustrates a particular example of a GUI that may be generated by the system of FIG. 1.
Figure 3:
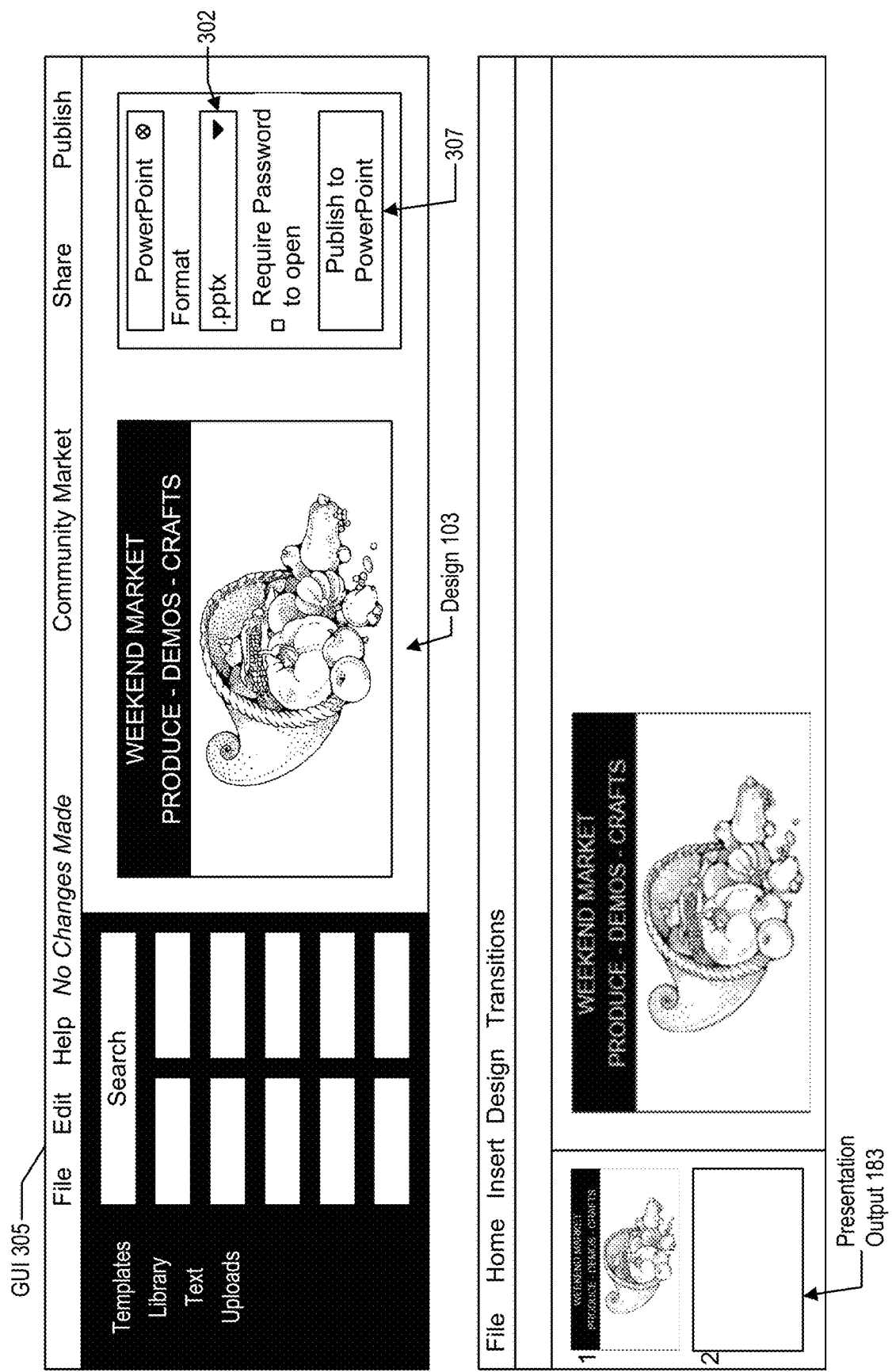
FIG. 3 illustrates another particular example of a GUI that may be generated by the system of FIG. 1.
Figure 4:
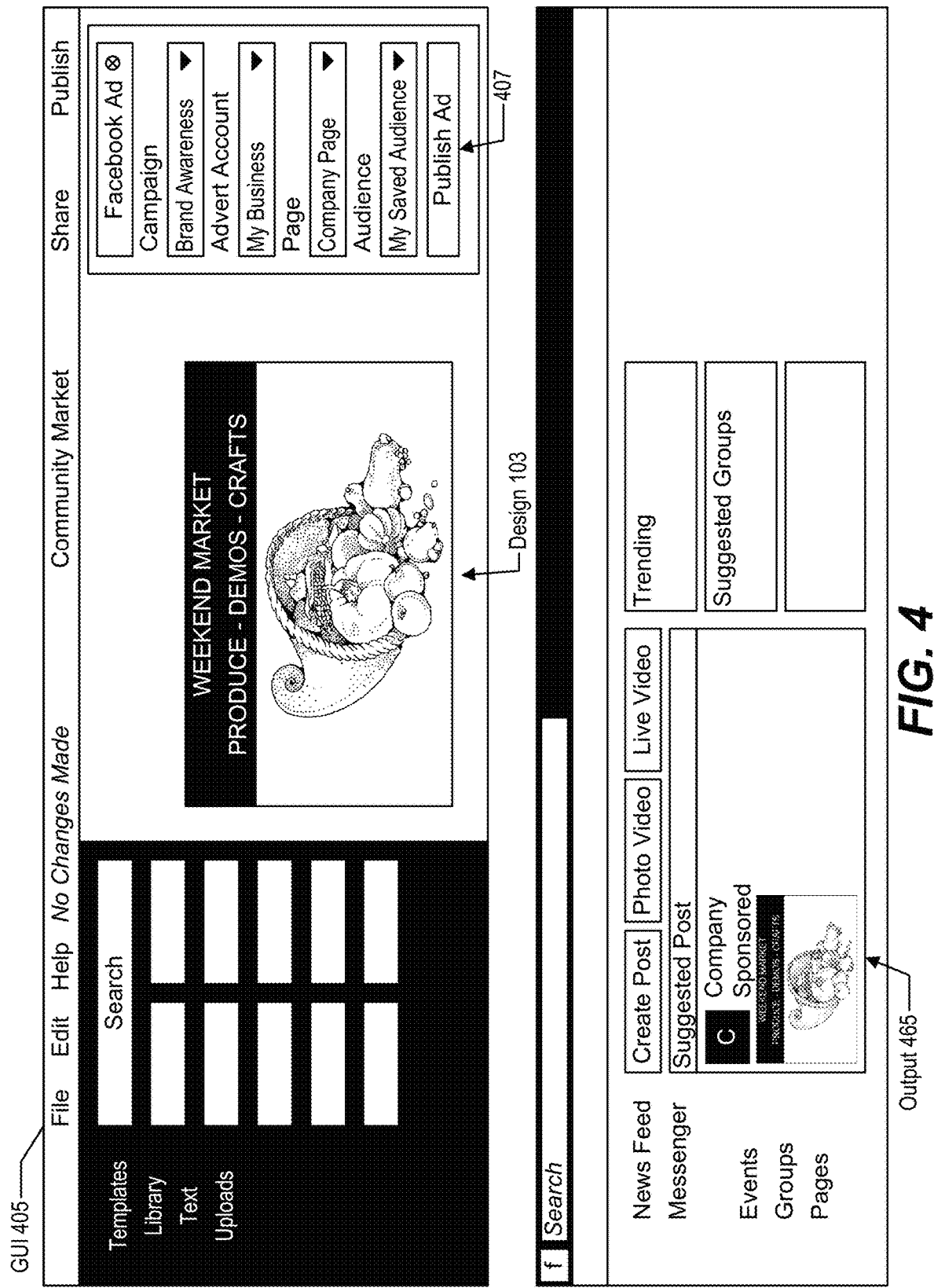
FIG. 4 illustrates another particular example of a GUI that may be generated by the system of FIG. 1.
Figure 5:
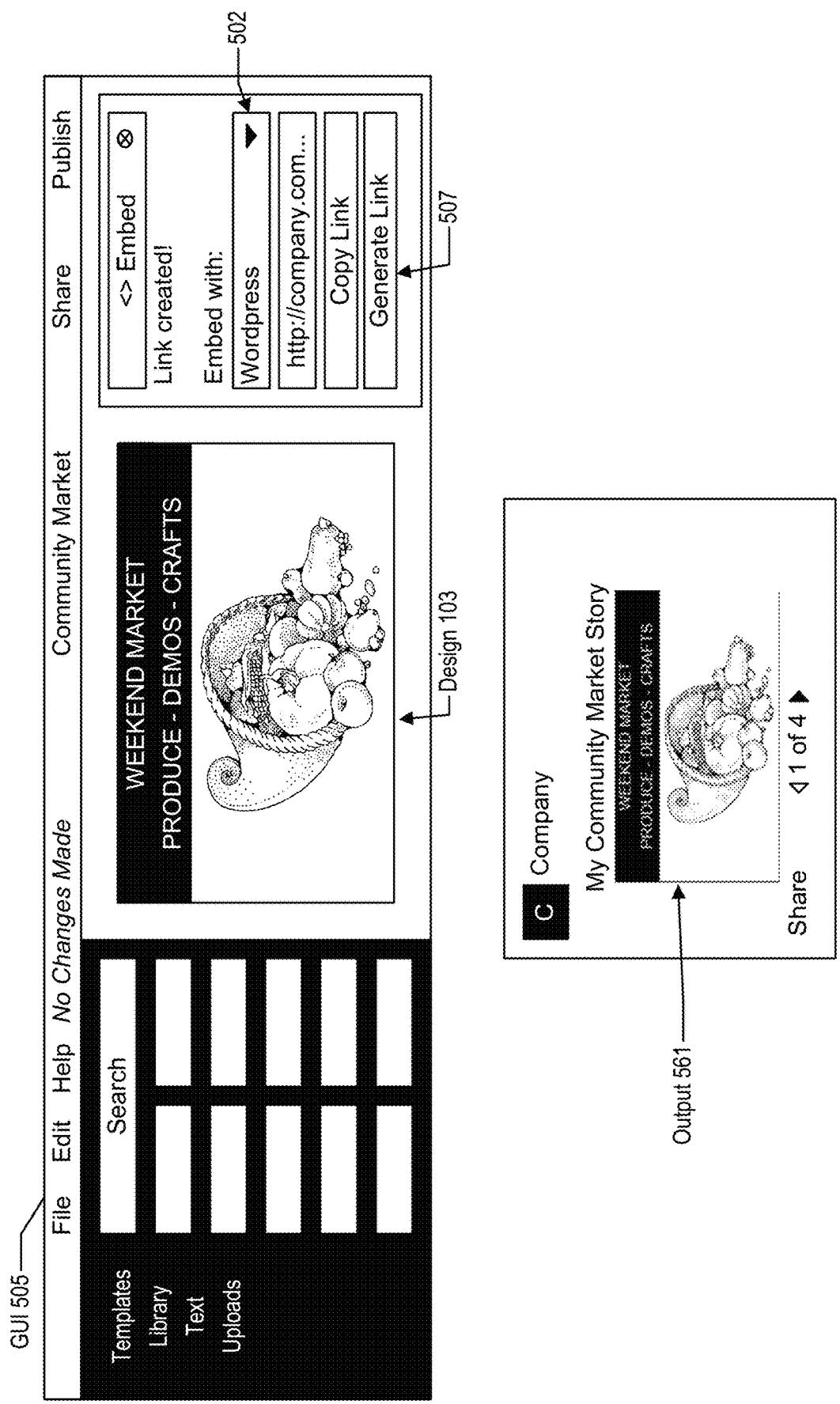
FIG. 5 illustrates another particular example of a GUI that may be generated by the system of FIG. 1.
Figure 6:
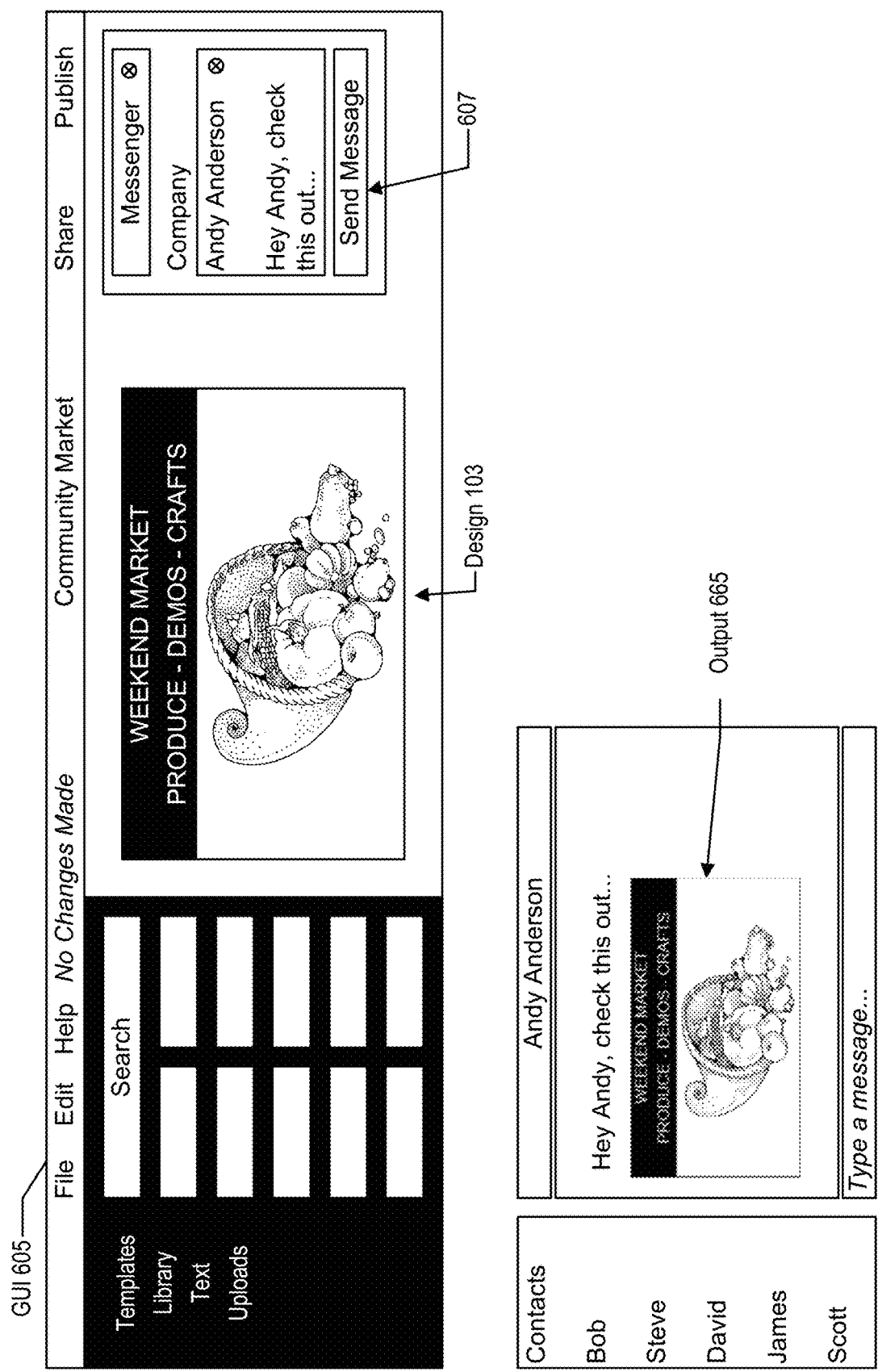
FIG. 6 illustrates another particular example of a GUI that may be generated by the system of FIG. 1.
Figure 7:
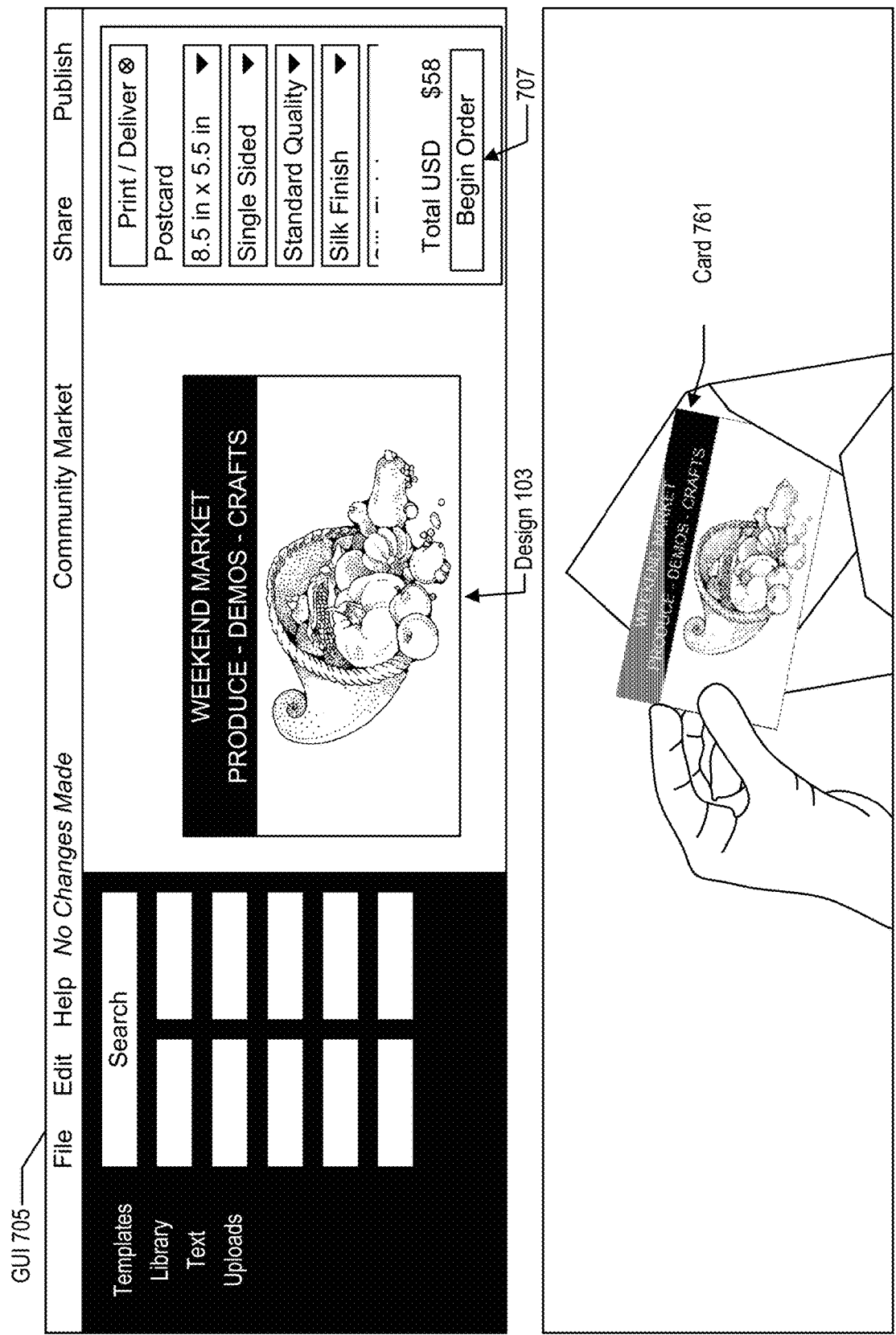
FIG. 7 illustrates another particular example of a GUI that may be generated by the system of FIG. 1.
Figure 8:
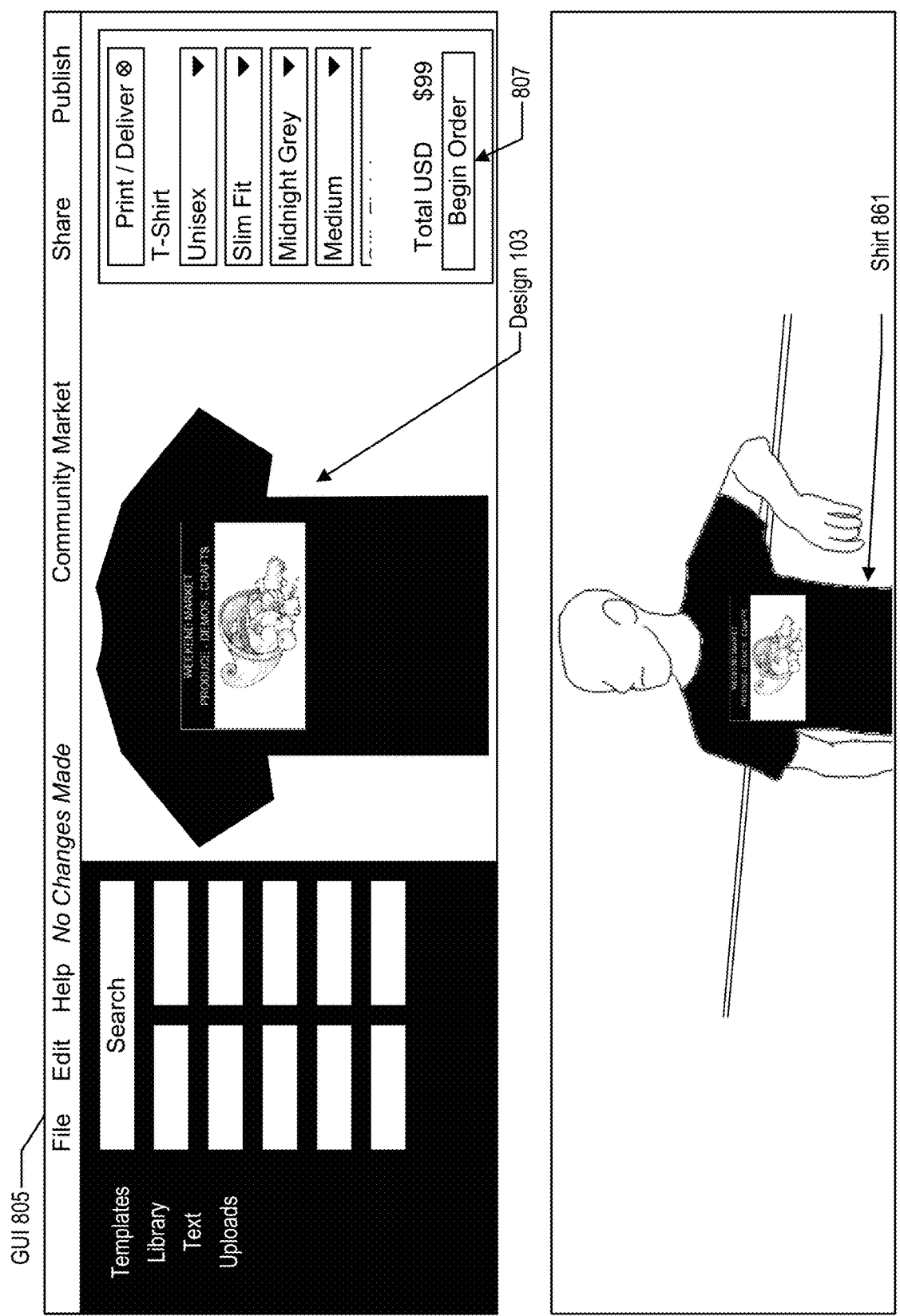
FIG. 8 illustrates another particular example of a GUI that may be generated by the system of FIG. 1.
Figure 9:
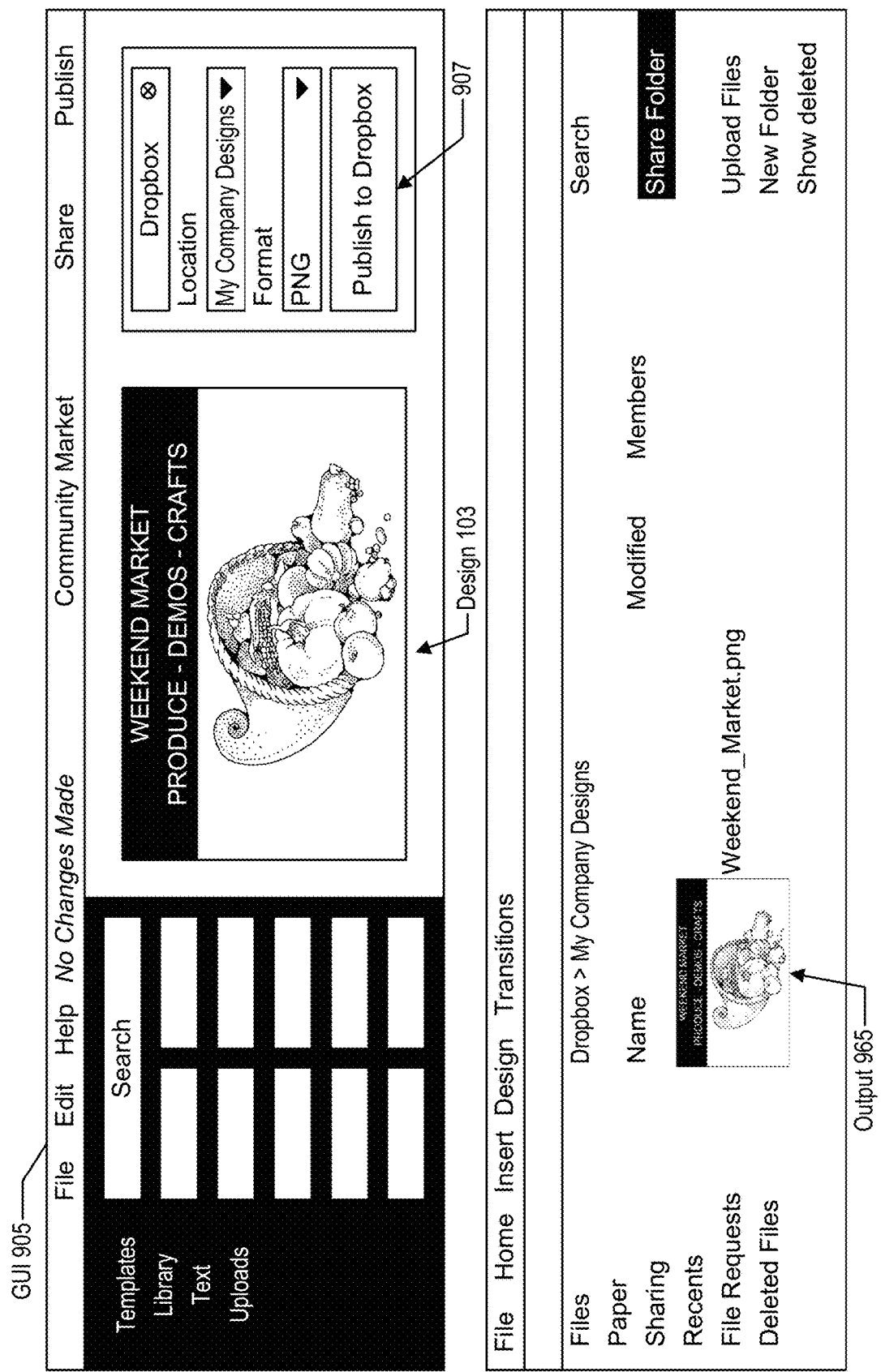
FIG. 9 illustrates another particular example of a GUI that may be generated by the system of FIG. 1.
Figure 10:
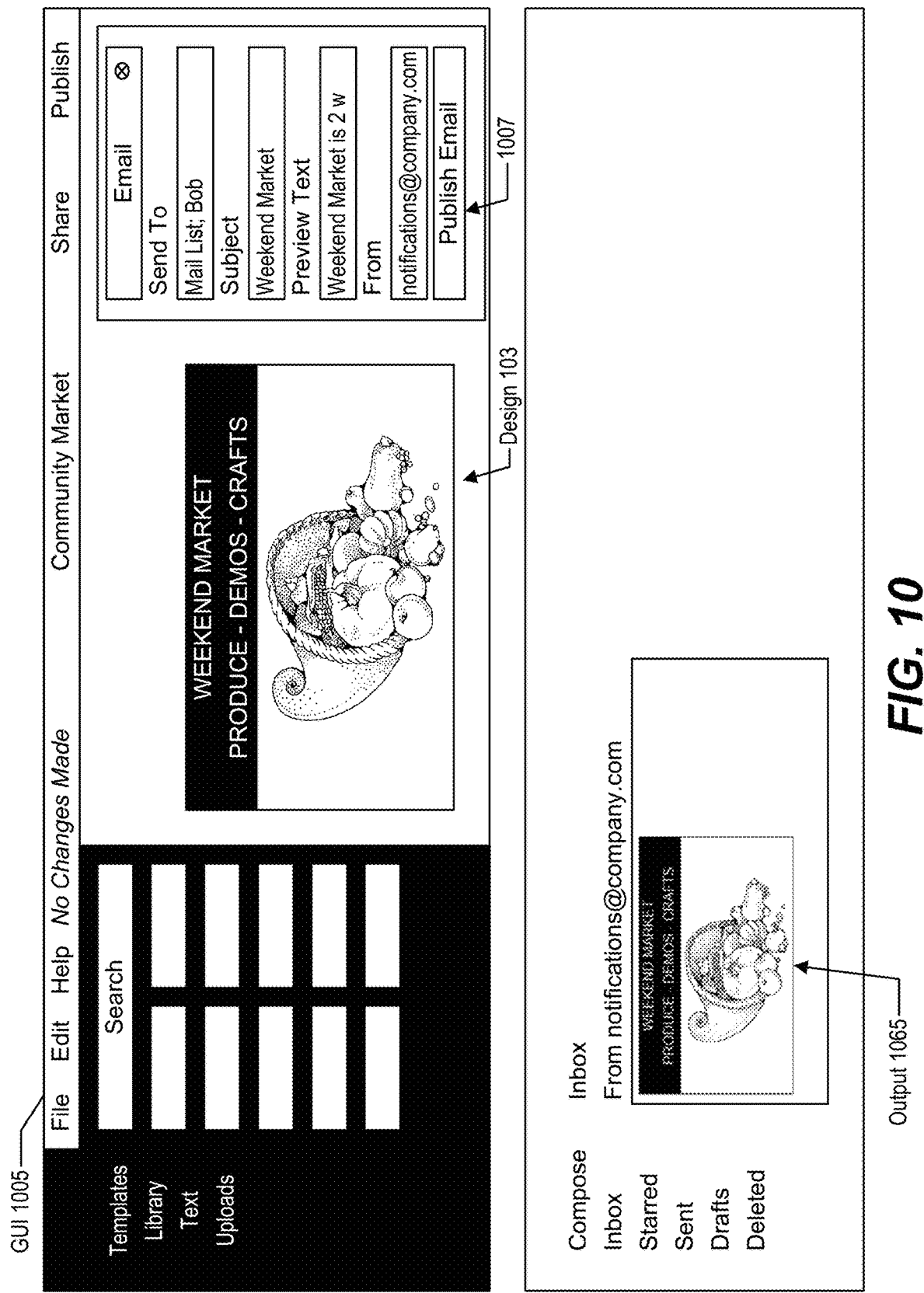
FIG. 10 illustrates another particular example of a GUI that may be generated by the system of FIG. 1.
Figure 11:
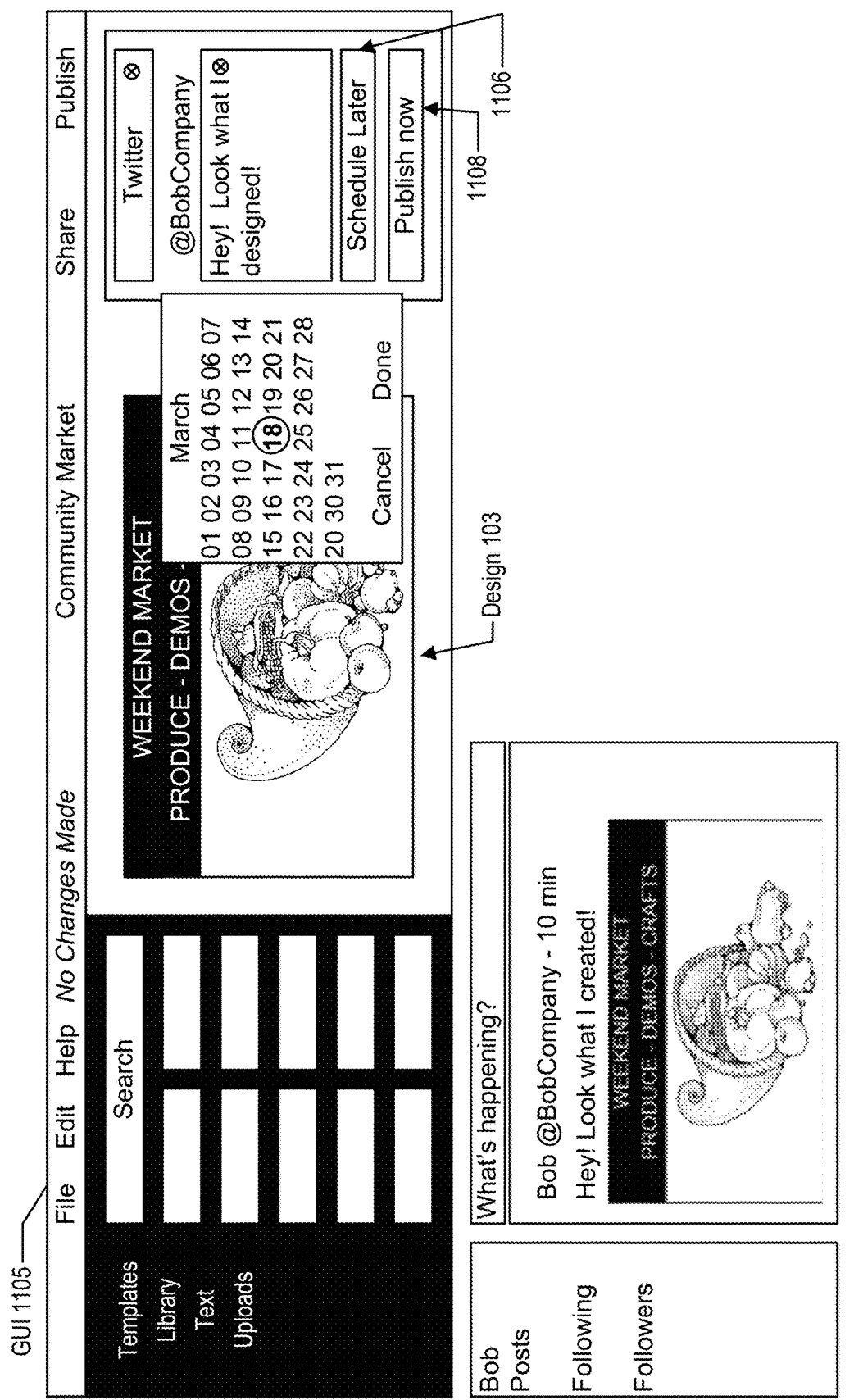
FIG. 11 illustrates another particular example of a GUI that may be generated by the system of FIG. 1.
Figure 12:
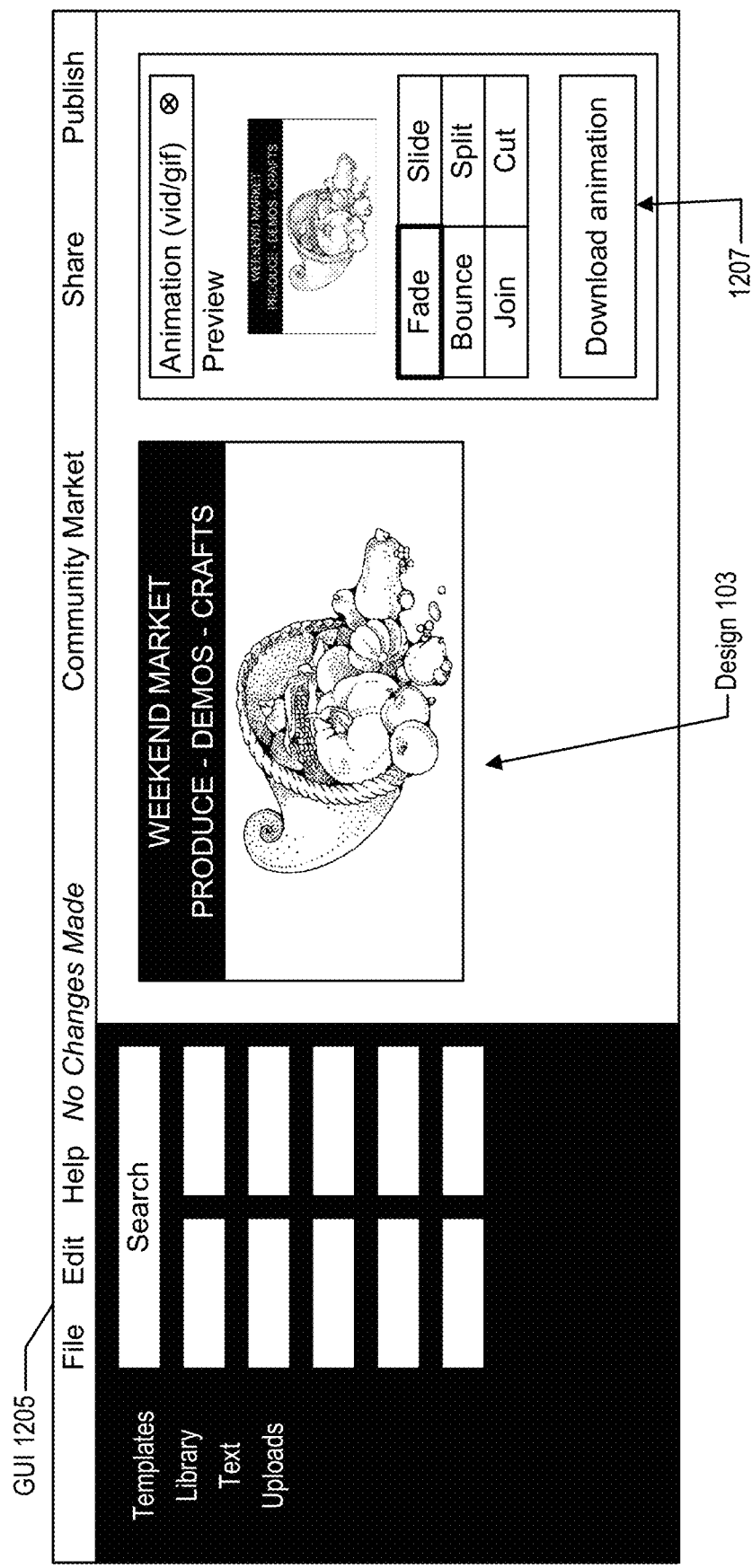
FIG. 12 illustrates another particular example of a GUI that may be generated by the system of FIG. 1.
Figure 13:
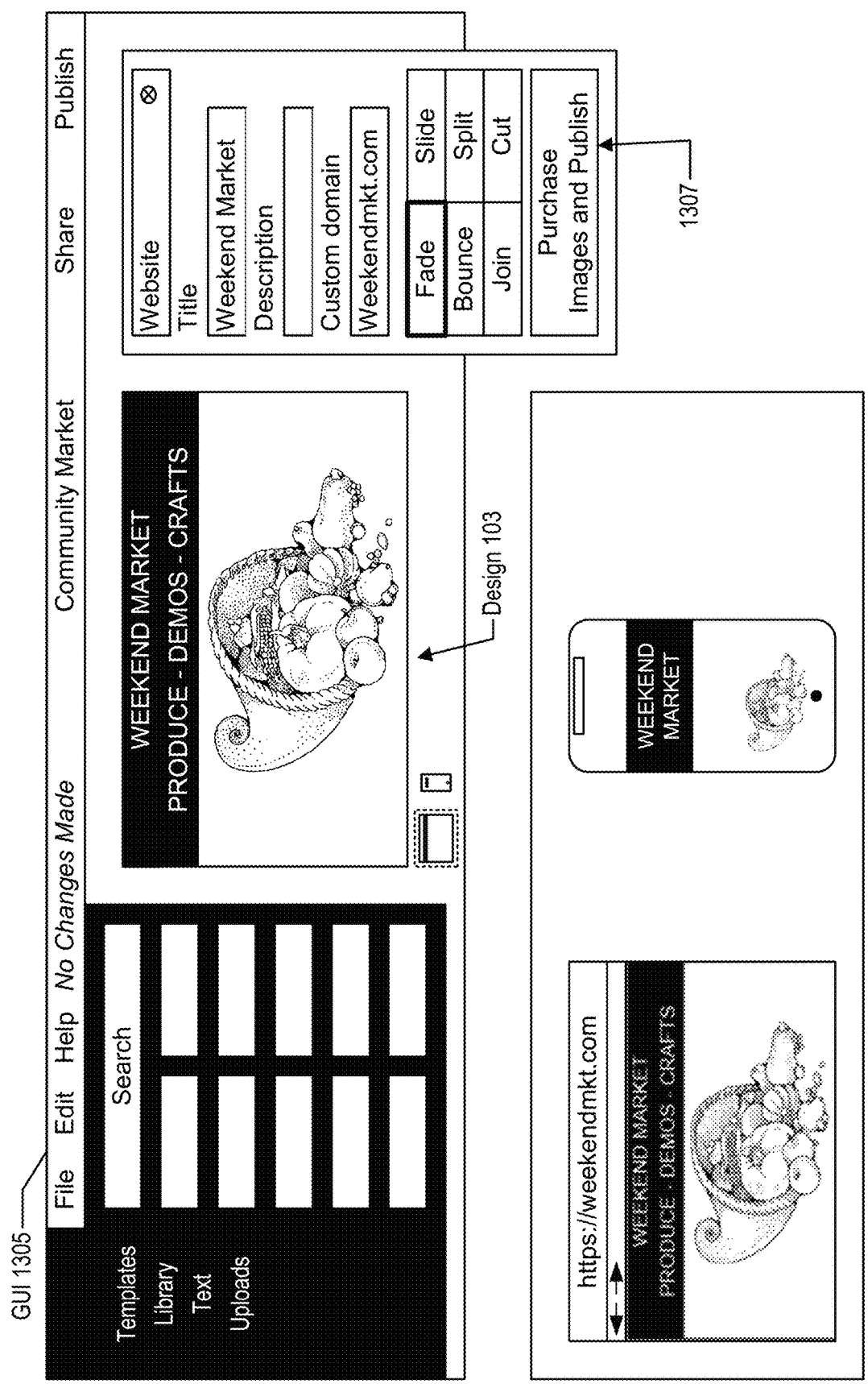
FIG. 13 illustrates another particular example of a GUI that may be generated by the system of FIG. 1.
Figure 14:
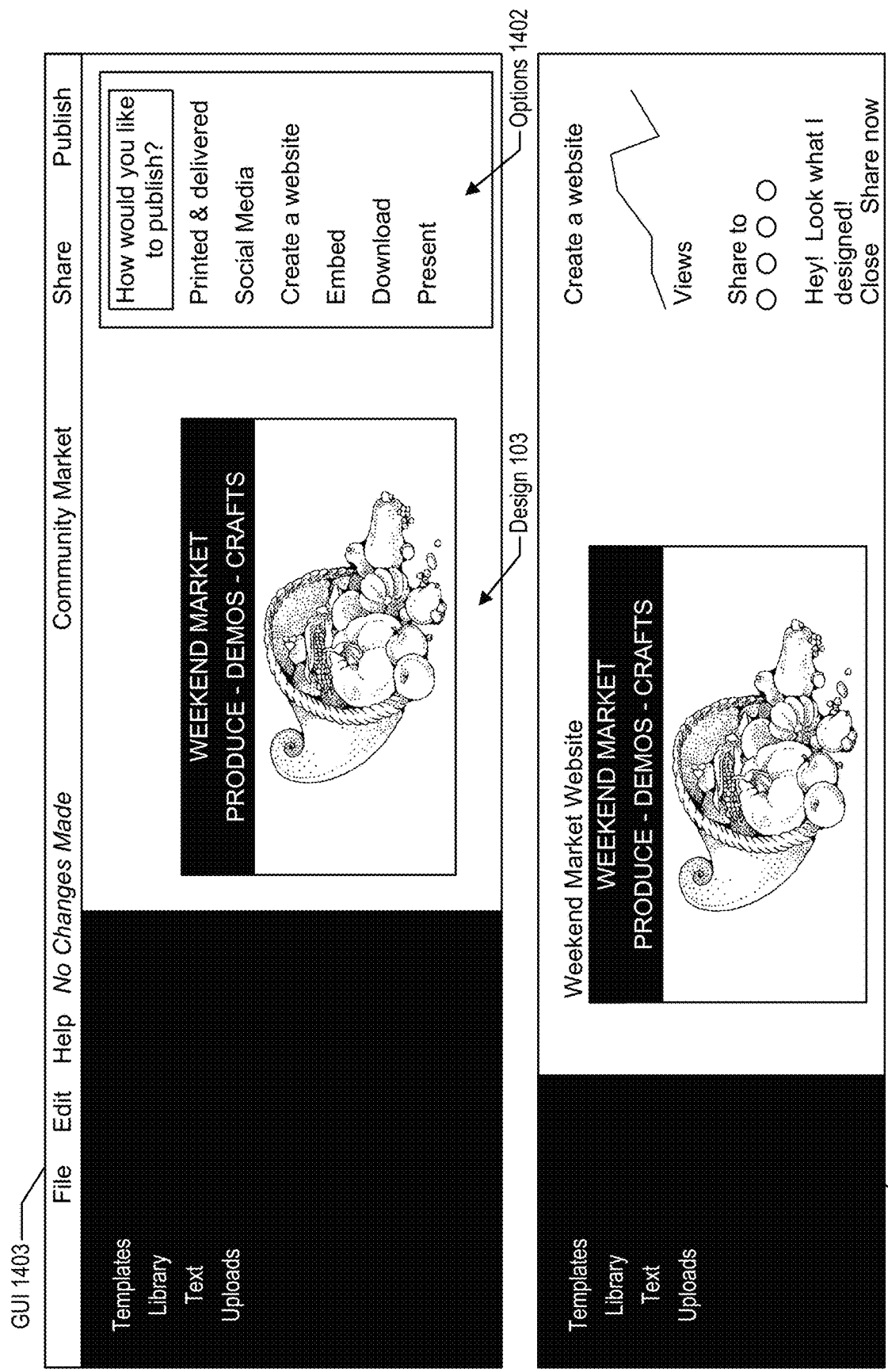
FIG. 14 illustrates another particular example of a GUI that may be generated by the system of FIG. 1.
Figure 15:
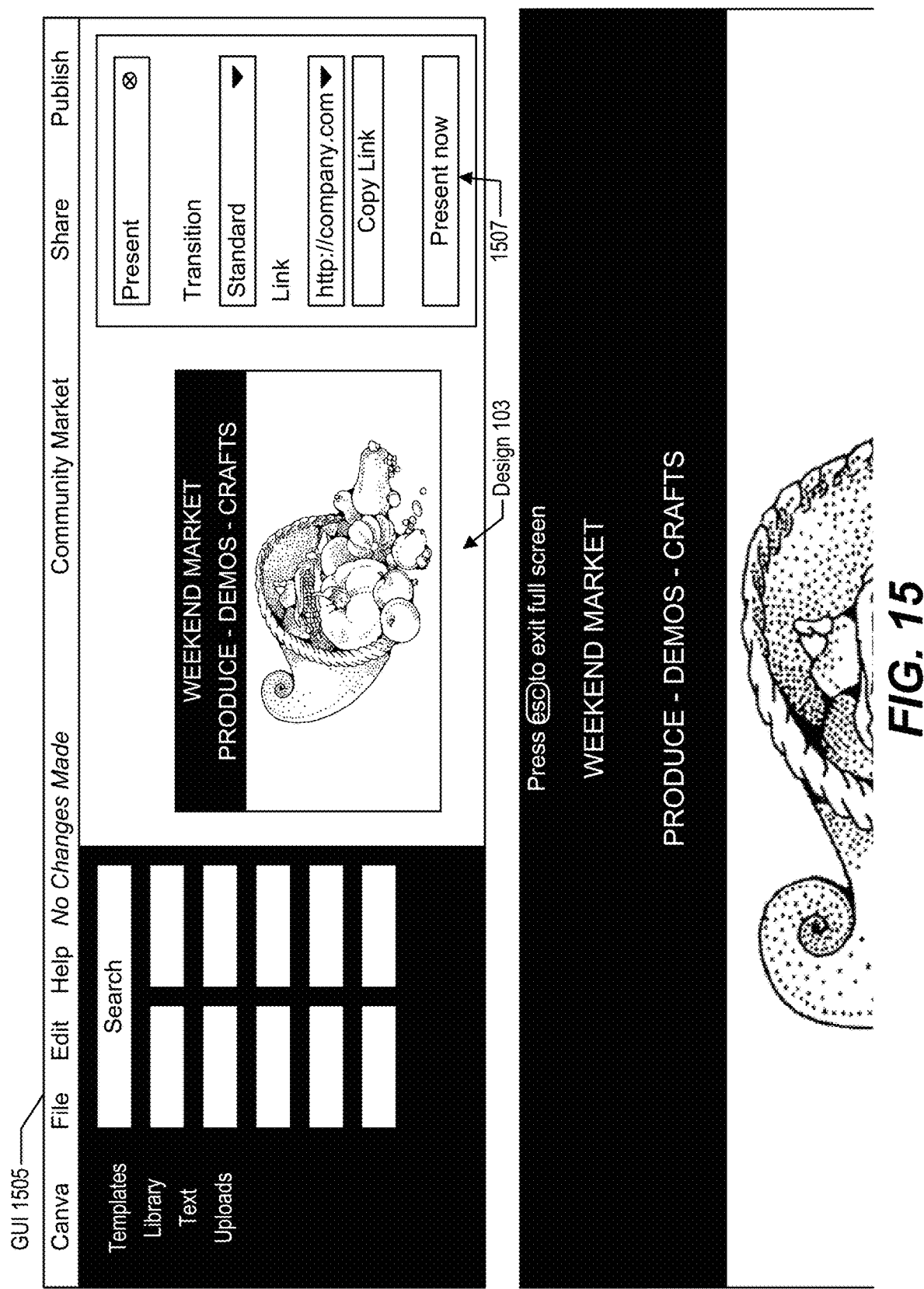
FIG. 15 illustrates another particular example of a GUI that may be generated by the system of FIG. 1.
Figure 16:
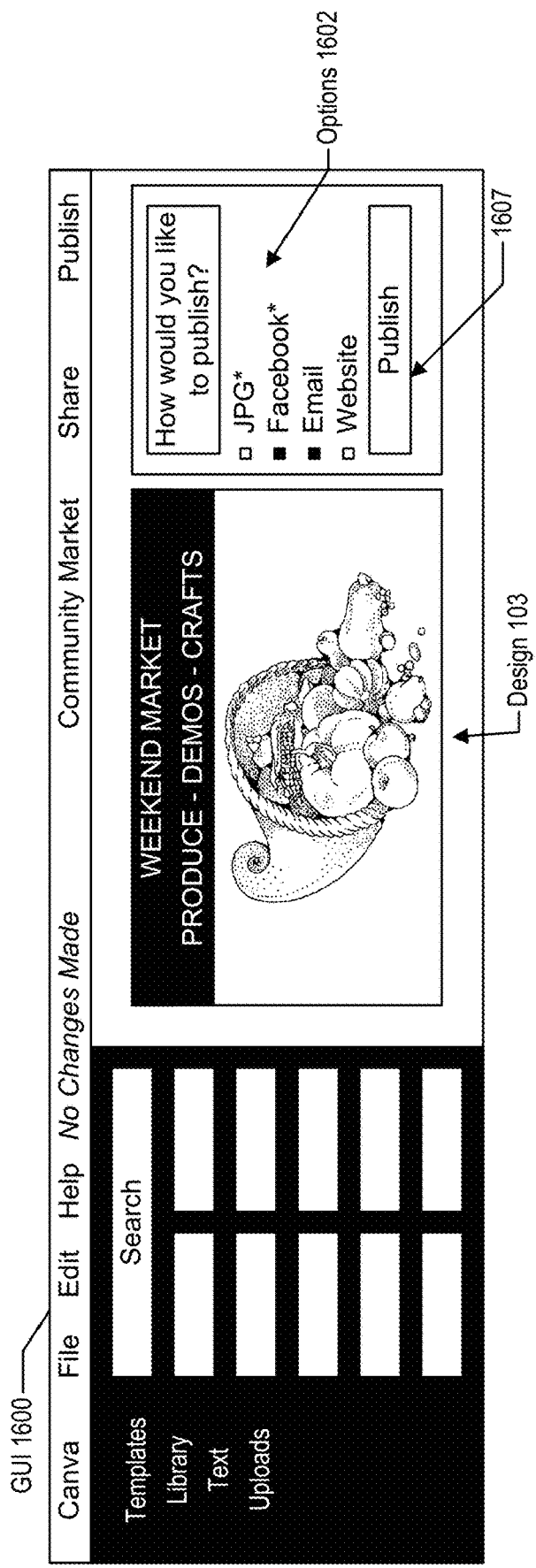
FIG. 16 illustrates another particular example of a GUI that may be generated by the system of FIG. 1.

In particular, FIG. 2 illustrates publishing the design 103 as an image (e.g., a JPG image). FIG. 3 illustrates publishing the design 103 as a presentation, such as a PowerPoint® presentation. FIG. 4 illustrates publishing the design 103 as a social network site post, such as a Facebook® (a registered trademark of Facebook, Inc., Menlo Park, Calif.) post. FIG. 5 illustrates publishing the design 103 as an embedded link in a website using a website development tool, such as WordPress® (a registered trademark of WordPress Foundation, San Francisco, Calif.). FIG. 6 illustrates publishing the design 103 as a message (e.g., instant message). FIG. 7 illustrates publishing the design 103 as a printed card. FIG. 8 illustrates publishing the design 103 as a printed shirt. FIG. 9 illustrates publishing the design 103 to a shared online workspace, such as a Dropbox® (a registered trademark of Dropbox, Inc., San Francisco, Calif.) workspace. FIG. 10 illustrates publishing the design 103 as an electronic mail (e-mail). FIG. 11 illustrates publishing the design 103 as a social network site, such as Twitter® (a registered trademark of Twitter, Inc., San Francisco, Calif.) post. FIG. 12 illustrates publishing the design 103 as an animation. FIG. 13 illustrates publishing the design 103 as a website. FIG. 14 illustrates selecting to publish the design 103 as a website and tracking views to the website. FIG. 15 illustrates publishing the design 103 by creating a shareable link. FIG. 16 illustrates publishing the design 103 by selecting one or more of a list of publishing options. One or more of the available publishing options may be automatically suggested. For example, the list of publishing options may be ordered such that the suggested publishing options appear at a more prominent location in (e.g., at the top of) the list and/or are visually distinguished as being suggested options.

In FIG. 2, a GUI 205 includes a publish option 207 (e.g., a download button), a display portion configured to display the design 103, and a dropdown 202 for selecting an endpoint (e.g., an application or a format). The GUI 205 may include one or more options for selecting (or specifying) the endpoint settings 119 of FIG. 1. For example, the GUI 205 may include a first option to select all pages of the design 103, a second option to specify a range of pages of the design 103, a third option to select a particular resolution (e.g., high resolution), or a combination thereof.

During operation, the GUI 205 may be displayed by a browser of the client device 192. The user 104 of FIG. 1 may use the dropdown 202 to select the endpoint 172, such as a JPG endpoint. It should be understood that JPG is described herein as an illustrative example of an endpoint; in some examples, another format endpoint (e.g., a PDF endpoint) can be specified. The client device 192 may, in response to detecting the user selection of the publish option 207, generate the user request 111, the endpoint settings 119 of FIG. 1, or a combination thereof. The user request 111 may indicate the endpoint 172. The endpoint settings 119 may indicate that all or a range of pages of the design 103 are to be published at a particular resolution. The client device 192 may transmit the user request 111, the endpoint settings 119, the browser information 113 of the browser, or a combination thereof, to the export service 110 of FIG. 1.

The export service 110 may, in response to receiving the user request 111, check mapping data for a JPG publishing workflow. To illustrate, the mapping data may indicate that publishing the design 103 to a JPG file involves a first sequence of format services. For example, the first sequence of format services may indicate that the design 103 is to be provided to the HTML format service 132, that a first output of the HTML format service 132 is to be provided to the image format service 146, and that a second output of the image format service 146 is the JPG publishing output (e.g., an image of a rendered webpage that is as similar as possible to a webpage being viewed by the user when the publish option 207 is selected). It should be understood that particular sequences of services are described herein as illustrative examples. In other examples, a sequence of services may include format services in a different order, one or more additional, fewer, and/or different format services.

The export service 110 may generate the JPG output by executing (or causing to be executed) the first sequence of format services. For example, the export service 110 may generate a first request for the HTML format service 132, where the first request indicates the design 103, the endpoint settings 119, or a combination thereof. The export service 110 may send the first request to the HTML format service 132, as described with reference to FIG. 1. The HTML format service 132 may generate the HTML output 151 by converting the design 103 from a platform-independent format to an HTML format, as described with reference to FIG. 1.

The HTML format service 132 may generate the HTML output 151 based on the endpoint settings 119. For example, the endpoint settings 119 may indicate a range of pages of the design 103 that are to be published and the HTML format service 132 may generate the HTML output 151 corresponding to the range of pages of the design 103. As another example, the endpoint settings 119 may indicate a resolution. To illustrate, the HTML format service 132 may determine that the endpoint settings 119 indicate a default resolution (e.g., a medium resolution) in response to determining that the endpoint settings 119 indicate that the user 104 did not select an option of the GUI 205 corresponding to a resolution. The design 103 may include (e.g., identifiers of) one or more media items. The HTML format service 132 may send a media URL request to the export service 110. The media URL request may indicate media characteristics (e.g., the resolution) indicated by the endpoint settings 119. The export service 110 may select copies (versions) of the one or more media items having the resolution. The export service 110 may provide media URLs of the one or more media items to the HTML format service 132. The HTML output 151 may include (e.g., identifiers of) the copies of the one or more media items. For example, the HTML output 151 may include the media URL 165 of a particular version of the media item 163, the particular version of the media item 163, or both.

The HTML format service 132 may store the HTML output 151 in the export database. The HTML format service 132 may provide, to the export service 110, an indication (e.g., an identifier of the HTML output 151) that processing of the first request is complete.

The export service 110 may, in response to receiving such an indication, generate a second request indicating the HTML output 151. The second request may also indicate the browser information 113, the endpoint settings 119, the endpoint 172, the client device 192, or a combination thereof. The export service 110 may send the second request to the image format service 146, as described with reference to FIG. 1.

The image format service 146 may generate the image output 153 by processing the HTML output 151 based on the browser information 113, the endpoint 172, or a combination thereof, as described with reference to FIG. 1. The image output 153 may include the one or more media items (e.g., the copies of the one or more media items) indicated by the HTML output 151. For example, the image format service 146 may use the media URL 165 to retrieve the corresponding version of the media item 163 from the media database 185. To illustrate, the image format service 146 may provide the media URL 165 to the media service 116 and the media service 116 may provide the corresponding version of the media item 163 from the media database 185 to the image format service 146. The image format service 146 may generate the image output 153 having a particular format (e.g., a JPG format).

In a particular aspect, the image format service 146 may generate the image output 153 based on the endpoint settings 119. For example, the image format service 146 may determine that the endpoint settings 119 indicate a default resolution (e.g., a medium resolution) in response to determining that the endpoint settings 119 indicate that the user 104 did not select an option of the GUI 205 corresponding to a resolution. The image format service 146 may generate the image output 153 to have a resolution indicated by the endpoint settings 119.

In a particular aspect, the image output 153 may include multiple images. For example, the image output 153 may include a first image corresponding to a first page of the design 103 (or the HTML output 151), a second image corresponding to a second page of the design 103 (or the HTML output 151), one or more additional images, or a combination thereof. The image output 153 may include the one or more media items indicated by the HTML output 151. Alternatively, multiple design pages may be tiled in a single image file.

The image format service 146 may store the image output 153 in the export database. The image format service 146 may provide, to the export service 110, the image output 153 (e.g., an identifier of the image output 153), an indication that processing of the second request is complete, or a combination thereof. In a particular aspect, the export service 110, in response to receiving the indication and determining that the first sequence indicates that the image output 153 of the image format service 146 corresponds to a format services output for the endpoint 172, sends the image output 153 (or an identifier of the image output 153) to the endpoint 172, the client device 192, or both. In another particular aspect, the image format service 146 sends the image output 153 or an identifier of the image output 153 (e.g., Weekend_Market.JPG or an identifier of Weekend_Market.JPG) to the endpoint 172, the client device 192, or both. The client device 192 may store the image output 153 (e.g., Weekend_Market.JPG or an identifier of Weekend_Market.JPG) in memory (e.g., a Downloads folder in local memory).

When the user 104 selects (e.g., clicks on) the image output 153 (or the identifier of the image output 153), the client device 192 may provide the image output 153 (e.g., Weekend_Market.JPG) to a display device. In a particular aspect, when the user 104 selects (e.g., clicks on) an identifier of the image output 153, the client device 192 may retrieve the image output 153 (e.g., Weekend_Market.JPG) from the export database and may provide the image output 153 to the display device.

In FIG. 3, a GUI 305 includes a publish option 307 (e.g., a publish to PowerPoint® button), and a dropdown 302 for selecting an endpoint (e.g., an application or a format). The GUI 305 may include one or more options for selecting (or specifying) the endpoint settings 119 of FIG. 1. For example, the GUI 305 may include a password option for the published output to be restricted from being opened/viewed without a password.

The user 104 may use the dropdown 302 to select a PowerPoint® endpoint. It should be understood that PowerPoint® is described herein as an illustrative example of an endpoint, and that different formats may be used in other examples. The user 104 may select (or not select) the password option. The user 104 may select the publish option 307 by clicking on the publish to PowerPoint® button. The client device 192 may, in response to detecting the user selection of the publish option 307, generate the user request 111, the endpoint settings 119 of FIG. 1, or a combination thereof. The user request 111 may indicate a PowerPoint® format/endpoint. The client device 192 may transmit the user request 111, the endpoint settings 119, the browser information 113 of the browser, or a combination thereof, to the export service 110 of FIG. 1.

The export service 110 may, in response to receiving the user request 111, determine that mapping data indicates that publishing to a PowerPoint® file involves a second sequence of format services. For example, the second sequence of format services may indicate that the design 103 is to be provided to the HTML format service 132, that a first output of the HTML format service 132 is to be provided to the image format service 146, a second output of the image format service 146 is to be provided to the presentation format service 189, and that the presentation output 183 corresponds to a format services output for the endpoint 172.

The export service 110 may generate the presentation output 183 by executing (or causing to be executed) the second sequence of format services. For example, the export service 110 may send a first request to the HTML format service 132 and may subsequently send the a second request to the image format service 146, as described with reference to FIGS. 1-2. The export service 110 may also generate and send a third request to the PowerPoint® format service 189, the third request indicating the image output 153 (e.g., an identifier of the image output 153), the endpoint settings 119, the endpoint 172, the client device 192, or a combination thereof.

In a particular aspect, the sequence of format services that is executed may be short-circuited. For example, if the design 103 was published recently or publication to multiple endpoints is occurring concurrently (or at least partially concurrently), the export database may contain partially processed output of one or more services. To illustrate, the HTML output 151 of the HTML format service 132 may be available in the export database before the HTML format service 132 is invoked as part of the sequence to publish to PowerPoint®. In such an example, the previously stored HTML output 151 may be used rather than invoking the HTML format service 132 to regenerate the HTML output 151.

The presentation format service 189, in response to receiving the third request, generates the presentation output 183 by processing the image output 153 based on the endpoint settings 119. For example, the presentation output 183 may include a first slide corresponding to a first image of the image output 153, a second slide corresponding to a second image of the image output 153, and so on.

In a particular aspect, the presentation format service 189 may generate the presentation output 183 based on the endpoint settings 119. For example, the presentation format service 189 may generate the presentation output 183 (e.g., a PowerPoint® presentation file) to have a password in response to determining that the endpoint settings 119 indicate that the user 104 selected the password option. Alternatively, the presentation format service 189 may generate the presentation output 183 (e.g., the PowerPoint® presentation) to not have a password in response to determining that the endpoint settings 119 indicate that the user 104 did not select the password option.

The presentation format service 189 may store the presentation output 183 (e.g., a PowerPoint® presentation file) in the export database. The presentation format service 189 may provide, to the export service 110, the presentation output 183 (e.g., the PowerPoint® presentation), an indication that processing of the third request is complete, or both.

In a particular aspect, the export service 110 or the presentation format service 189 sends the presentation output 183 or an identifier thereof (e.g., Weekend_Market.pptx or an identifier of Weekend_Market.pptx) to the endpoint 172, the client device 192, or both. The client device 192 may store the presentation output 183 or an identifier of the presentation output 183 (e.g., Weekend_Market.pptx or an identifier of Weekend_Market.pptx) in memory (e.g., a Downloads folder in local memory).

When the user 104 selects (e.g., clicks on) the presentation output 183 or an identifier of the presentation output 183, the client device 192 may provide the presentation output 183 (e.g., Weekend_Market.pptx) to a display device. In a particular aspect, when the user 104 selects (e.g., clicks on) an identifier of the presentation output 183, the client device 192 may retrieve the presentation output 183 (e.g., Weekend_Market.pptx) from the export database and may provide the presentation output 183 to the display device.

In FIG. 4, a GUI 405 includes a publish option 407 (e.g., a Publish Ad button) associated with a social network site, such as Facebook®. The GUI 405 may include one or more options for selecting (or specifying) the endpoint settings 119 of FIG. 1. For example, the GUI 405 may include a campaign option to select a particular campaign, an account option to select a particular account, a page option to select a particular page, an audience option to select a particular audience, or a combination thereof.

The user 104 may use the campaign option to select a particular campaign (e.g., a "Brand Awareness" campaign), the account option to select a particular account (e.g., "My Business" account), the page option to select a particular page (e.g., "Company" page), the audience option to select a particular audience (e.g., "My Saved Audience"), or a combination thereof. In a particular aspect, available options in the GUI 405 may be based on settings associated with a user account of the user 104 at the endpoint 176 (e.g., Facebook®) and/or at the computing environment. For example, the audience option of the GUI 405 may include a particular audience (e.g., "My Saved Audience") when settings associated with a user account at the endpoint 176 (e.g., Facebook®) and/or at the computing environment include the particular audience.

The client device 192 may, in response to detecting the user selection of the publish option 407, generate the user request 111, the endpoint settings 119 of FIG. 1, or a combination thereof. The user request 111 may indicate a Facebook® endpoint. The client device 192 may transmit the user request 111, the endpoint settings 119, the browser information 113 of the browser, or a combination thereof, to the export service 110 of FIG. 1.

The export service 110 may, in response to receiving the user request 111, determine that mapping data indicates that publishing to Facebook® is to be done via a third sequence of format services. For example, the third sequence of format services may indicate that the design 103 is to be provided to the HTML format service 132, that a first output of the HTML format service 132 is to be provided to the image format service 146, a second output of the image format service 146 is to be provided to a format service (e.g., a Facebook® format service) of the output format services 194, and that a third output of the format service corresponds to a format services output for the endpoint 176.

The export service 110 may generate an output 465 (e.g., a format service output) by executing (or causing to be executed) the third sequence of format services on the design 103. In some examples, at least one of the format services in the sequence, e.g., the Facebook® format service, generates output that has characteristics (e.g., a particular resolution, color depth, file format, etc.) supported by or recommended by Facebook®. The output 465 may be stored in the export database and/or sent to the endpoint 176, the client device 192, or both. The export service 110 may send the endpoint settings 119 concurrently with the output 465. The client device 192 may store the output 465, the endpoint settings 119, or a combination thereof, in memory (e.g., a Downloads folder in local memory). In a particular aspect, the client device 192 may upload (e.g., transmit) the output 465, an identifier of the output 465, the endpoint settings 119, or a combination thereof, to a Facebook® server.

In a particular aspect, a Facebook® server may retrieve the output 465 from the export database in response to receiving the identifier of the output 465. The server may publish the format service output based on the endpoint settings 119. For example, the server may publish the format service output as corresponding to the particular campaign (e.g., a "Brand Awareness" campaign), the particular account (e.g., "My Business" account), the particular page (e.g., "Company" page), or a combination thereof. The server may publish a Facebook® post to be visible to (e.g., viewable by) the particular audience (e.g., "My Saved Audience").

In a particular aspect, the endpoint settings 119 may indicate a scheduled publish time and a server may retrieve, at or subsequent to the scheduled publish time, the format service output from the export database. The computing environment (e.g., the export service 110) may conserve network resources (e.g., bandwidth) by not sending the format service output to the server if publishing of the format service output is canceled prior to the scheduled publish time.

In FIG. 5, a GUI 505 includes a publish option 507 (e.g., a Generate Link button) and a dropdown 502 that enables selecting an endpoint (e.g., an application). In the illustrated example, a WordPress® site/blog is selected. The user 104 may select the publish option 507 by clicking on the Generate Link button. The client device 192 may generate the user request 111 in response to detecting the user selection of the publish option 507. The user request 111 may indicate the WordPress® site/blog endpoint. The client device 192 may transmit the user request 111, the browser information 113 of the browser, or a combination thereof, to the export service 110 of FIG. 1.

The export service 110 may, in response to receiving the user request 111, determine that mapping data indicates that publishing to WordPress® maps to a fourth sequence of format services. The export service 110 may generate an output 561 (e.g., a format service output) by executing (or causing to be executed) the fourth sequence of format services on the design 103. The export service 110 may send the output 561 to a web server running WordPress®, the client device 192, or both. The client device 192 may store the output 561 in memory (e.g., a Downloads folder in local memory).

An endpoint (e.g., the server hosting a WordPress® site/blog) may generate an embeddable element. For example, the embeddable element may include images of page(s) of the design 103, HTML webpages generated based on the page(s) of the design 103, etc. The export service 110 may generate a link (e.g., a URL) for the embeddable element. In an alternate aspect, the export service 110 may receive the link from the endpoint. A web front end may update the GUI 505 to indicate that a link has been created and may include an option to copy the link. The user 104 may use the link to embed the embeddable element in other content (e.g., a webpage, a message, a social media post, etc.).

In FIG. 6, a GUI 605 includes a publish option 607 (e.g., a Send Message button) which may be associated with the endpoint that includes a message server, such as for Facebook® messenger. The GUI 605 may include an option to specify the endpoint settings 119 of FIG. 1. For example, the GUI 605 may include a recipient field to specify one or more message recipients. The GUI 605 may include a text field to specify message text. In a particular aspect, available options in the GUI 605 may be based on account settings associated with a user account of the user 104. For example, the recipient field of the GUI 605 may suggest (e.g., autocomplete names of) recipients that have Facebook® messenger accounts, that are indicated as contacts in the account settings, or both.

The user 104 may select one or more recipients by typing (or selecting) recipient names in the recipient field. The user may use a keyboard to enter message text in the text field. The user 104 may select the publish option 607 by clicking (e.g., performing a mouse-click on) the Send Message button. The client device 192 may, in response to detecting the user selection of the publish option 607, generate the user request 111, the endpoint settings 119 of FIG. 1, or a combination thereof. The client device 192 may transmit the user request 111, the endpoint settings 119, the browser information 113 of the browser, or a combination thereof, to the computing environment.

The export service 110 may, in response to receiving the user request 111, determine that mapping data indicates that publishing to the Facebook® messenger involves a fifth sequence of format services. Depending on implementation, an output 665 of the fifth sequence of format services may be a Facebook® messenger message (e.g., generated and sent using an application programming interface (API)) or may be a file, such as an image, that is provided to a Facebook® messenger application or server for sharing with other users. The Facebook® messenger message may be sent to the recipients indicated by the endpoint settings 119 and may include the message text indicated by the endpoint settings 119.

In FIG. 7, the publish option 707 is a Begin Order button for a printed card ordering site. The GUI 705 may include a size option to select a particular size, a side option to select single-sided printing or double-sided printing, a quality option to select print quality, a finish option to select a print finish, one or more additional options, or a combination thereof.

The user 104 may use the size option to select a particular size (e.g., 8.5 inches×5.5 inches), the side option to select single-sided printing or double-sided printing (e.g., single-sided printing), the quality option to select a particular print quality (e.g., Standard Quality), the finish option to select a particular finish (e.g., Silk Finish), or a combination thereof. The GUI 705 may also display a cost of the order with the selected options.

The client device 192 may, in response to detecting user selection of the publish option 707, generate the user request 111, the endpoint settings 119 of FIG. 1, or a combination thereof. The client device 192 may transmit the user request 111, the endpoint settings 119, the browser information 113 of the browser, or a combination thereof, to the export service 110 of FIG. 1.

The export service 110 may, in response to receiving the user request 111, determine that mapping data indicates that the endpoint 176 (e.g., the printed card ordering site) maps to a sixth sequence of format services. The final output of the sixth sequence of format services may have a specific resolution and/or print quality as indicated by the endpoint settings 119. In some examples, one or more mailing addresses indicated by configuration data are provided to the printed card ordering site. The printed card ordering site may print cards (e.g., an illustrative card 761) that comply with the endpoint settings 119 (e.g., single-sided vs. double-sided, card size, print quality, card finish, etc.).

Depending on implementation, publishing output for the printed cards (e.g., a printing proof) may be saved to the export database and/or sent to the client device 192. Printed cards may also be delivered to the user 104 and/or specified recipients in accordance with a delivery mechanism offered by the printed card ordering site.

In FIG. 8, a GUI 805 includes a publish option 807 (e.g., a Begin Order button) associated with a printed shirt ordering site. The GUI 805 may include one or more options for selecting (or specifying) a style option to select a shirt style, a fit option to select a shirt fit, a color option to select a shirt color, a size option to select a shirt size, one or more additional options, or a combination thereof.

The user 104 may use the style option to select a particular style (e.g., Unisex), the fit option to select a particular fit (e.g., Slim Fit), the color option to select a particular color (e.g., Midnight Grey), the size option to select a particular size (e.g., Medium), or a combination thereof. The GUI 805 may display a cost of the order with the selected options.

The user 104 may select the publish option 807 by clicking on the Begin Order button. The client device 192 may, in response to detecting the user selection of the publish option 807, generate the user request 111, the endpoint settings 119 of FIG. 1, or a combination thereof.

The export service 110 may, in response to receiving the user request 111, determine that mapping data indicates that printed shirt ordering maps to a seventh sequence of format services. The export service 110 may generate a final output by executing (or causing to be executed) the seventh sequence of format services on the design 103. In particular aspects, one or more of the format services in the sequence generate output that has a particular resolution based on the particular style, the particular fit, the particular size, or a combination thereof, indicated by the endpoint settings 119. For printed shirt ordering, configuration data may indicate one or more mailing addresses to which printed shirts are to be sent.

A printed shirt ordering site may print shirts (e.g., an illustrative shirt 861) that comply with the endpoint settings 119 (e.g., in terms of size, fit, color, style, etc.). Depending on implementation, publishing output for the printed shirts (e.g., a printing proof) may be saved to the export database and/or sent to the client device 192. Printed shirts may also be delivered to the user 104 and/or specified recipients in accordance with a delivery mechanism offered by the printed shirt ordering site.

In some examples, the publishing output for printed card ordering or printed shirt ordering is an order message, document, or file that includes all of the necessary information for a printed card ordering site or a printed shirt ordering site to execute, bill, and deliver an order. For example, the publishing output may be an order email. As another example, the publishing output may be used by the export service 110 to automatically "place" an order (or cause the order to be placed) at the printed card ordering site or the printed shirt ordering site. To illustrate, a web browser may be executed at the computing environment or at a print format service (not visible to the user 104) and the publishing output may be used to automatically fill an online order form, including automatically uploading images that are part of the publishing output, automatically populating text fields based on the publishing output, the endpoint settings 119, and/or the configuration data, etc.

In FIG. 9, a GUI 905 includes a publish option 907 (e.g., a Publish to Dropbox® button). Dropbox® is an example of online storage that provides shared online workspace. The GUI 905 may include one or more options for selecting (or specifying) the endpoint settings 119 of FIG. 1. For example, the GUI 905 may include a location option to select a location (e.g., online folder), a format option to select a particular format, one or more additional options, or a combination thereof.

The user may use the location option to select a particular location (e.g., a "My Company Designs" folder), the format option to select a particular format (e.g., a PNG format), or both. In a particular aspect, available options in the GUI 905 may be based on settings associated with a Dropbox® account of the user 104 and/or an account of the user 104 at the computing environment. The user 104 may select the publish option 907 by clicking on the Publish to Dropbox® button. The client device 192 may, in response to detecting the user selection of the publish option 907, generate the user request 111, the endpoint settings 119 of FIG. 1, or a combination thereof.

The export service 110 may, in response to receiving the user request 111, determine that mapping data indicates that publishing to Dropbox® maps to an eighth sequence of format services. The export service 110 may generate an output 965 by execute (or cause to be executed) the eighth sequence of format services on the design 103. The output 965 (e.g., including "Weekend_Market.png") may have the particular format (e.g., PNG) indicated by the endpoint settings 119, may have a resolution supported/recommended by Dropbox®, etc. The output 965 may be saved in the export database, sent to the client device 192, and/or automatically uploaded to the user's Dropbox® account (e.g., in the "My Company Designs" folder specified by the endpoint settings 119).

In FIG. 10, a GUI 1005 includes a publish option 1007 (e.g., a Publish Email button). The GUI 1005 may include a recipient option to specify one or more email recipients, a subject option to specify an email subject, a preview text option to enter email preview text, a sender option to specify an email sender, one or more additional options, or a combination thereof. The user may use the recipient option to specify one or more email recipients (e.g., Mail List; Bob), the subject option to specify a particular email subject (e.g., "Weekend_Market"), the preview text option to specify email preview text (e.g., "Weekend_Market is 2 w"), the sender option to specify an email sender (e.g., notifications@company.com").

The user 104 may select the publish option 1007 by clicking on the Publish Email button. The client device 192 may, in response to detecting the user selection of the publish option 1007, generate the user request 111, the endpoint settings 119 of FIG. 1, or a combination thereof. The export service 110 may, in response to receiving the user request 111, determine that mapping data indicates that publishing to email maps to a ninth sequence of format services. The export service 110 may generate an output 1065 by executing (or causing to be executed) the ninth sequence of format services on the design 103.

In some examples, at least one format service may generate output to have a particular resolution or format that is suitable for email attachment/transmission. The output 1065 may be stored in the export database, send to an internet server, and/or sent to the client device 192. In the illustrated example, the output 1065 is shown in an email that is automatically generated and sent as a result of clicking the "Publish Email" button. As shown in FIG. 9, the "From" field of the email lists the "notifications@company.com" email address entered by the user 104 and the body of the email includes a published version of the design 103. In various examples, publishing to email includes adding an email message to inboxes of email accounts of the email recipients, adding the email message to a sent folder of an email account of the email sender, etc.

In FIG. 11, the GUI 1105 includes two options for publishing to Twitter®: a schedule later option 1106 and a publish now option 1108. The GUI 1105 also includes a text field to enter text that is to be published to Twitter® along with the design 103, e.g., "Hey! Look what I designed!" The user 104 may select the schedule later option 1106 or the publish now option 1108. The GUI 1105 may, in response to a selection of the schedule later option 1106, display a calendar (as shown) so that the user can specify a particular date on which the text and design 103 will be published to Twitter®.

The client device 192 may, in response to detecting the user selection of one of the options 1106 or 1108, generate the user request 111, the endpoint settings 119 of FIG. 1, or a combination thereof. The export service 110 may, in response to receiving the user request 111, determine that mapping data indicates that publishing to Twitter® maps to a tenth sequence of format services, and may execute (or cause to be executed) the tenth sequence of format services. If the schedule later option 1106 was selected, the tenth sequence of format services may not be executed until at (or closer to) the selected publication date. Alternatively, publishing output 1161 may be generated and stored at the export database before the selected publication date and may be retrieved on the selected publication date and sent to a Twitter® server, unless the user has since cancelled the publication request. The publishing output 1161 may include an image of the design 103 that has a resolution supported/recommended by Twitter®. Network resources (e.g., bandwidth) may thus be conserved by not sending publishing output 1161 to an external server for publication canceled prior to the scheduled publication date.

In FIG. 12, a GUI 1205 includes a publish option 1207 (e.g., a Download animation button). The GUI 1205 may include an animation option to indicate a type of animation (e.g., transition between pages of the design 103). The user 104 may use the animation option to select a type of animation (e.g., Fade, Slide, Bounce, Split, Join, or Cut). The user 104 may select the publish option 1207 by clicking on the Download animation button. The client device 192 may, in response to detecting the user selection of the publish option 1207, generate the user request 111, the endpoint settings 119 of FIG. 1, or a combination thereof. The export service 110 may, in response to receiving the user request 111, determine that mapping data indicates that publishing to an animation maps to an eleventh sequence of format services, and may execute (or cause to be execute) the eleventh sequence of format services on the design 103.

In a particular aspect, the animation format service 187 generates the animation output 182 (e.g., animation frames) by generating a first number of frames for each page in the design 103. The animation format service 187 may create a second number of frames for each transition between design pages. Different transitions (e.g., fade, bounce, etc.) may occupy a different number of frames. The animation format service 187 may stitch all of the frames together to generate the animation output 182, which may be saved to the export database, sent to an external server, and/or sent to the client device 192 (e.g., for storage in a "Downloads" folder). The animation output 182 may be in GIF, video formats (e.g., moving picture experts group (MPEG)-4), etc.

In FIG. 13, a GUI 1305 includes a publish option 1307 (e.g., a Purchase Images and Publish button) which may correspond to publishing output for a responsive website configured for web, tablet, or mobile display. The GUI 1305 may include one or more options for selecting (or specifying) a website title, a description option to specify a website description, a custom domain option to specify a custom domain, an animation option to indicate a type of animation (e.g., Fade, Slide, Bounce, Split, Join, or Cut transitions between pages of the design 103), one or more additional options, or a combination thereof.

In the illustrated example, the website title is "Weekend Market," the custom domain is "Weekendmkt.com," and the animation type is "Fade." The user 104 may select the publish option 1307 by clicking on the Purchase Images and Publish button. The client device 192 may generate the user request 111 in response to detecting the user selection of the publish option 1307. The export service 110 may, in response to receiving the user request 111, determine that mapping data indicates that publishing to a custom website maps to a twelfth sequence of format services.

The export service 110 may generate the web output 181 by executing (or causing to be executed) the twelfth sequence of format services on the design 103. In particular examples, the web format service 186 may generate multiple versions of a website based on the design 103. For example, a first version of the website may be generated for presentation on larger/landscape display devices, such as desktop monitors, laptop computers, presentation screens, tablet computers, etc. A second version of the website may be generated for presentation on smaller/portrait display devices, such as mobile telephones or personal digital assistants. Additional versions may also be generated (e.g., for wearable devices having display screens).

The versions of the websites may differ with respect to resolution, aspect ratio, whether particular text/image content is present, placement of particular text/image content, etc. In particular aspects, the web format service 186 may generate the various versions of the website automatically. For example, the web format service 186 may execute a rules engine that indicates mobile telephone content should be no larger than a particular resolution, images should be cropped so as to preserve the image center, fonts should be at least (or no more than) a particular size, menus including more than a particular number of items should be collapsed into sub-menus, etc. The rules engine may also specify preferred file formats for images, animations, videos, etc. for each version of the website.

In some examples, the design 103 includes one or more media items that have an associated publishing cost. When the user 104 clicks the "Purchase Images and Publish" button, the export service 110 may send a request to a billing service of the computing environment to charge an account of the user 104 for the publishing cost of the one or more media items included in the design 103. After payment is verified, format services may generate publishing output as described above.

Once versions of the website have been generated, the export service 110 may automatically upload website content to particular web servers. The web servers may be part of the computing environment or may be external to the computing environment. Publishing output may also be saved in the export database and/or sent to the client device 192.

In FIG. 14, a GUI 1403 includes one or more options 1402 for publishing the design 103, such as "Printed and delivered," "social media," "Create a website," "Embed," "Download," and "Present." A selection of the "Printed and delivered" option may correspond to the publishing operations described with reference to FIGS. 7 and/or 8. A selection of the "social media" option may correspond to publishing operations described with reference to FIGS. 4 and/or 11. A selection of the "Create a website" option may correspond to publishing operations described with reference to FIG. 13. A selection of the "Embed" option may correspond to publishing operations described with reference to FIG. 5. A selection of the "Download" option may correspond to publishing operations described with reference to FIGS. 2 and/or 12. A selection of the "Present" option may correspond to publishing operations described with reference to FIG. 3.

In a particular aspect, the GUI 1403 may include a search field. When a large number of publish endpoints are available, the user 104 may search for publish endpoints by entering text in the search field. As text is entered into the search field, the GUI 1403 may dynamically filter the list of publish endpoints based on the text in the search field. In a particular aspect, the GUI 1403 may autocomplete the text entered in the search field. In some examples, certain publish endpoints may be elevated in the list of endpoints or may otherwise be visually designated as "suggested," as described with reference to FIGS. 1 and 16. Alternatively or additionally, publish endpoints that have already been selected and/or published to may be visually designated as such in the list.

In some examples, when the user 104 publishes the design 103 to a website (e.g., as described with reference to FIG. 13), a GUI 1405 may operable to view statistics associated with the website. To illustrate, the computing environment may maintain data website views. A web front end of the computing environment may generate the GUI 1405, which displays a preview or rendering of the website and also displays view count information. In the example shown, the GUI 1405 also includes controls to share the website to various social networks.

In FIG. 15, a GUI 1505 includes a publish option 1507 (e.g., a Present now button). Unlike publishing to a presentation file (e.g., to PowerPoint®), "Present now" may generate a dynamic and interactive web presentation that does not require the use of an external software application or viewer. The web presentation may be accessible using a URL hosted by the computing environment or hosted external to the computing environment. In the illustrated example, the GUI 1505 includes a dropdown to select a transition between pages of the design (e.g., "Standard-change on click").

The user 104 may select the publish option 1507 by clicking on Present now button. The client device 192 may generate the user request 111 in response to detecting the user selection of the publish option 1507. The export service 110 may, in response to receiving the user request 111, generate an output by executing (or causing execution of) a thirteenth sequence of format services on the design 103.

In some aspects, the presentation website may include dynamic presentation controls. For example, the presentation website may include an option to enter/exit full screen presentation mode. Additional options supported by the "Present now" workflow may include, but are not limited to transitions, mouse cursor type, interactions, hover effects, editing an image (e.g., resize, zoom in, zoom out, crop, etc.), or a combination thereof.

In FIG. 16, a GUI 1600 includes a publish option 1607 (e.g., a Publish button). The GUI 1605 supports concurrently (or at least partially concurrently) publishing the design 103 to multiple endpoints. Any number of endpoints may be chosen for concurrent publication. In the illustrated example, Facebook® and Email are chosen from a list of options 1602. One or more of the options 1602 may be "suggested" by the computing environment. In the illustrated example, "JPG" and "Facebook®" are suggested, as evidenced by the asterisk ("*") indication. Such indications may include a particular font, a particular character, particular text, a particular color, a particular shape, or a combination thereof. Suggested publish options may be identified based on user history, publish history for the design, and/or attributes of the design (e.g., color palette, resolution, specific text content in the design, specific image content in the design, a template that the design is based on, etc.).

In a particular aspect, the export service 110 identifies a suggested option based on determining that the design 103 is suitable for publishing in accordance with the suggested option. For example, designs suitable for the "Printed and Delivered" option may have a single page or two pages (e.g., for front-and-back card printing), fewer than a threshold number of colors (e.g., 5), or both. As another example, designs suitable for the "Twitter®" option may include fewer than a threshold number of characters (e.g., 140 or 280 characters). It should be understood that the described examples of identifying an option as suggested are illustrative. The export service 110 (or another component of the computing environment) may use any criterion for identifying a publishing option as suggested.

The publish option 1607 can be selected to start publication to one or more selected endpoints. When multiple endpoints are selected, the export service 110 may concurrently process format service sequences associated with the multiple options.

Concurrently exporting a single platform-independent design to multiple endpoints (without having to provide specific GUI input for each of the endpoints) may reduce a delay associated with generating separate designs corresponding to each endpoint. The described systems and methods may thus decouple the design process from the publishing process, and may enable a design-once-publish-many paradigm. Remote users can share information (e.g., the design 103) in real time in various platform-specific formats regardless of the platform-independent format. For example, the user 104 can create a design using the graphic design website and can share the design using multiple platforms with multiple users. To illustrate, the user 104 can share the design in real-time or near-real-time using a particular platform that is accessible by a second user independently of whether the second user has access to the graphic design website. The reduction in design/publishing delay may enable the graphic design website to support time-critical functionality. For example, the graphic design website may enable the user 104 to launch a multiplatform campaign in real-time or near-real-time. For example, the user 104 may create/update the design 103 based on real-time or near-real-time information and publish the design to multiple endpoints to launch a multiplatform campaign. As an illustrative non-limiting example, the user 104 may monitor a live telecast of an event with celebrities. The user 104 may update the design 103 to include an advertisement of a particular product (e.g., a particular kind of vitamins) in response to hearing a celebrity mention of the particular product and publish the design 103 to multiple endpoints almost immediately after the celebrity makes the statement. The marketing campaign may be available on multiple platforms (e.g., Facebook®, Twitter®, etc.) almost immediately. The timeliness of the publication of the design 103 across multiple platforms may increase a likelihood that the published design is included in the search results presented to the customer, leading to a purchase of the particular product based on the published design. The sooner the design 103 is published after the celebrity mention of a particular product, the higher the likelihood of views of the published design resulting in purchases and the higher the likelihood that the purchase is from a vendor associated with the published design (as opposed to a competitor).

In some aspects when multiple endpoints are selected for concurrent publication, the GUI displays preview images (e.g., thumbnails) received from the publishing services invoked during the publication process. To illustrate, the GUI may concurrently display publishing previews including images, social network posts, websites, etc. The described systems and methods may thus enable concurrent publication and previewing without requiring a user to navigate/drill-down through multiple menus per endpoint and without having to launch applications, screens, or windows distinct from the GUI (e.g., separate image viewing applications, social networking applications, browser windows/tabs, etc.) which can be slow and complex.

In some aspects, the export service 110 or another component of the computing environment is configured to handle user authentication as part of the publishing process. For example, the export service 110 may support OAuth-based authentication to various websites, social networks, etc. It is also to be understood that the various publish endpoints described herein are for illustration only. Supported publish endpoints may include, but are not limited to: PDF, PNG, JPG, Moving Picture Experts Group Layer-3 Audio (MP3), MOV, GIF, video, image, Facebook®, Facebook® Messenger, Twitter®, Pinterest® (a registered trademark of Pinterest, Inc., San Francisco, Calif.), Instagram® (a registered trademark of Instagram, LLC, Menlo Park, Calif.), LinkedIn® (a registered trademark of LinkedIn Corp., Sunnyvale, Calif.), Google+® (a registered trademark of Google Inc., Mountain View, Calif.), YouTube® (a registered trademark of Google Inc., Mountain View, Calif.), Tumblr® (a registered trademark of Tumblr, Inc., New York, N.Y.), an i18n (internationalization) network, VKontakte, Whatsapp® (a registered trademark of WhatsApp, Inc., Menlo Park, Calif.), QQ® (a registered trademark of Tencent Holdings Ltd., Grand Cayman, Cayman Islands), WeChat® (a registered trademark of Tencent Holdings Ltd., Grand Cayman, Cayman Islands), QZone® (a registered trademark of Tencent Holdings Ltd., Grand Cayman, Cayman Islands), Baidu® (a registered trademark of Baidu-.Com, Inc., Grand Cayman, Cayman Islands) Tieba, Snapchat® (a registered trademark of Snap Inc., Venice, Calif.), Skype® (a registered trademark of Microsoft Corp., Redmond, Wash.), Sina Weibo® (a registered trademark of Sina.Com Technology (China) Co., Beijing, China), Viber® (a registered trademark of Viber Media sarl, Luxembourg), LINE, YY® (a registered trademark of YoumiWalk Ltd., Hong Kong), BBM® (a registered trademark of BlackBerry Ltd., Ontario, Canada), Hike, Telegram® (a registered trademark of Telegram LLC, Wilmington, Del.), Xing, Kakaotalk® (a registered trademark of Kakap Corp., Seongnam-si, Republic of Korea), PowerPoint®, Microsoft® (a registered trademark of Microsoft Corp., Redmond, Wash.) Publisher, Adobe InDesign® (a registered trademark of Adobe Systems Inc., San Jose, Calif.), Adobe Illustrator® (a registered trademark of Adobe Systems Inc., San Jose, Calif.), Adobe Photoshop® (a registered trademark of Adobe Systems Inc., San Jose, Calif.), TV display, AdRoll® (a registered trademark of AdRoll, Inc., San Francisco, Calif.), Blackboard® (a registered trademark of Blackboard, Inc., Washington D.C.), Moodie® (a registered trademark of Sarah-Janet and Martin Dougiamas, West Perth, Australia), Slack® (a registered trademark of Slack Technologies, Inc., San Francisco, Calif.), Gmail® (a registered trademark of Google Inc., Mountain View, Calif.), DropBox®, Google® (a registered trademark of Google Inc., Mountain View, Calif.) Drive, email, website, Hootsuite® (a registered trademark of Hootsuite Media Inc., Vancouver, Canada), Buffer® (a registered trademark of Buffer Inc., Hong Kong), Hub Spot® (a registered trademark of Hub Spot Inc., Cambridge, Mass.), TweetDeck® (a registered trademark of Twitter, Inc., San Francisco, Calif.), Sprout Social® (a registered trademark of Sprout Social, Inc., Chicago, Ill.), Percolate® (a registered trademark of Percolate Industries, Brooklyn, N.Y.), SocialPilot, CoSchedule® (a registered trademark of Coschedule, LLC, Bismarck, N. Dak.), WordPress® (a registered trademark of WordPress Foundation, San Francisco, Calif.), Wix® (a registered trademark of Wix.com Ltd., Tel Aviv, Israel), paper product, physical product, SquareSpace® (a registered trademark of SquareSpace Inc., New York, N.Y.), Medium.com, a platform that supports oEmbed discovery, Flickr® (a registered trademark of Yahoo! Inc., Sunnyvale, Calif.), iCloud® (a registered trademark of Apple Inc., Cupertino, Calif.), Photobucket® (a registered trademark of Photobucket.com, Inc., Denver, Colo.), Box, scalable vector graphics (SVG), PhotoShop® (a registered trademark of Adobe Systems Inc., San Jose, Calif.) Document (PSD), Adobe Illustrator® Artwork (AI), Adobe InDesign® Document (INDD), Microsoft® Word Document (DOC), Moving Picture Experts Group Layer-4 Audio (MP4), Sketch file, Google® Sheet, comma-separated values (CSV), Salesforce® (a registered trademark of salesforce.com, San Francisco, Calif.), Amplitude® (a registered trademark of Amplitude, Inc., San Francisco, Calif.), HTML, embeddable design, Microsoft PowerPoint® (PPT) file, Microsoft® Word, G+® (a registered trademark of Google Inc., Mountain View, Calif.), an i18n platform, a social media platform, a social media scheduling tool, an editing tool, MailChimp® (a registered trademark of the Rocket Science Group, LLC, Atlanta, Ga.), Campaign Monitor® (a registered trademark of Campaign Monitor USA Inc., San Francisco, Calif.), an email campaign tool, a blog host, a website host, BigCommerce® (a registered trademark of Bigcommerce Pty Ltd, New South Wales, Australia), an advertisement network, AdWords® (a registered trademark of Google Inc., Mountain View, Calif.), a television noticeboard, an education platform, a digital asset management (DAM) system, an embeddable design, an offline presentation, emoji, animation, or a combination thereof.

Figure 17:
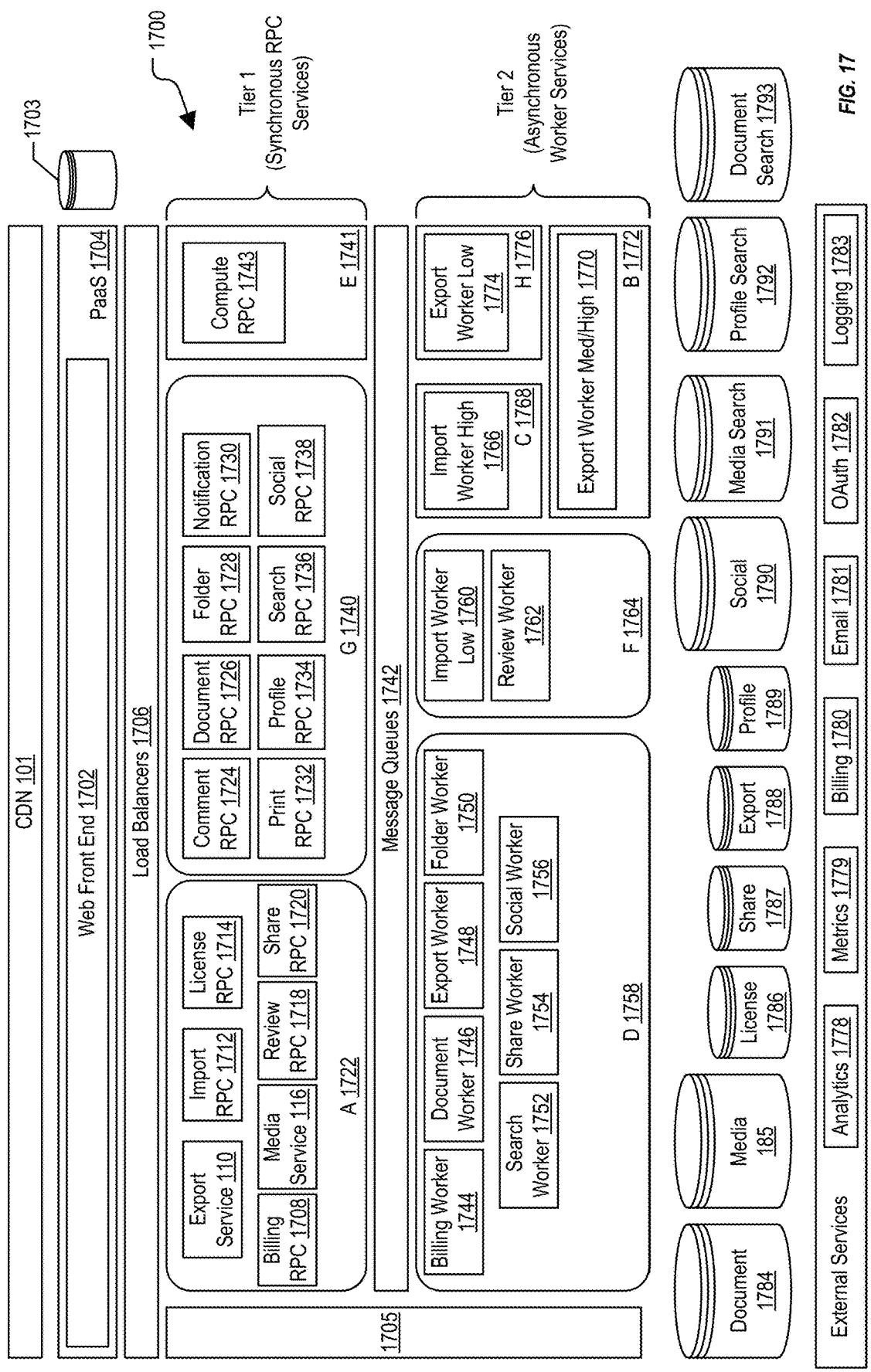
FIG. 17 illustrates another particular example of a system that is operable to publish a design.

Whereas FIG. 1 illustrates an example of a system 100 that is operable to publish a design, it is to be understood that operation of such a system may include various local and/or cloud-based components that are not illustrated in FIG. 1. For example, FIG. 17 depicts, in greater detail, a logical diagram of a system 1700 operable to support aspects of the present disclosure. Although illustrated in a logical diagram, it is to be understood that the various components of the system 1700 may include or may correspond to computer hardware, computer software, or a combination thereof. Moreover, components of the system 1700 may be configured to communicate with each other, for example via wired network(s) and/or wireless network(s). Thus, in various implementations, operations described herein as being performed by a particular component of FIG. 17 may be performed by dedicated hardware, software, or a combination thereof corresponding to the particular component.

In particular aspects, the system 1700 supports browser-based and mobile application-based access to a graphic design website. To illustrate, the graphic design website may correspond to a GUI (e.g., the GUI 205, the GUI 305, the GUI 405, the GUI 505, the GUI 605, the GUI 705, the GUI 805, the GUI 905, the GUI 1005, the GUI 1105, the GUI 1205, the GUI 1305, the GUI 1403, the GUI 1505, the GUI 1605, or a combination thereof), and some or all of the components in the system 1700 may be implemented by the computing environment, one or more servers, the media database 185, the client device 192 of FIG. 1, one or more message queues 1742, load balancers 1706, a document database 1784, and/or an export database 1788. For example, users may log in to the graphic design website and create, edit, and save graphic designs. The graphic design website may support operations including, but not limited to, creating a new design, applying a layout to a design, searching for and adding images to a design, saving a design, publishing of a design (as described with reference to the preceding figures), etc.

The system 1700 includes a web front end 1702 executed at a platform as a service (PaaS) provider 1704. The PaaS provider 1704 may enable at-scale deployment of software as a service (SaaS) applications, such as web applications. For example, the web front end 1702 may represent one, five, ten, or some other number of instances of a SaaS application that executes on hardware owned by and/or leased from the PaaS provider 1704. Each such instance of the front end SaaS application may be accessible via the Internet. In some examples, a browser or a mobile application executed by a user's computing device may access the web front end 1702 via the CDN 101. The CDN 101 may also be configured to cache static content (e.g., thumbnails, static images, static web content, etc.). To illustrate, when a user requests a particular content item, such as a particular image, if the CDN 101 (e.g., a server thereof) stores a copy of the image, the CDN may respond to the request without passing the request further into the service infrastructure shown in FIG. 17. The CDN 101 may thus include multiple geographically distributed "edge" servers that cache content.

The web front end 1702 may be configured to serve a graphic design website to requestors, such as by responding to hypertext transfer protocol (HTTP) GET requests, HTTP POST requests, etc. The web front end 1702 may also be configured to respond to application programming interface (API) calls originating from web browsers and/or mobile apps. In some examples, the web front end 1702 may utilize an in-memory cache 1703 that stores session data. To illustrate, when a user logs in to the graphic design website served by the web front end 1702, information regarding the user (e.g., display name, photo, subscription level, e-mail address, etc.) may be stored in the in-memory cache 1703 for rapid retrieval, processing, and/or rendering on some or all of the webpages of the graphic design website. Use of the in-memory cache 1703 may thus enable quickly serving webpages without accessing backend systems to determine user information.

The system 1700 includes the load balancers 1706 configured to support communication and workload distribution from the web front end 1702 to a plurality of backend services or microservices that execute, for example, on one or more virtual machines in a cloud computing environment. Each such virtual machine may be implemented using physical hardware that is owned by and/or leased by a cloud service provider. The system 1700 may support scaled, dynamic deployment of services based on scale groupings in a multi-tiered configuration. In particular aspects, services may be grouped in certain virtual machines based on expected load patterns for the services. The architecture of the system 1700 may enable the reorganization of these groupings with low effort, based on changes in observed load patterns or the introduction of new services. Separating services across multiple virtual machines may also enable scaling specific service groups in response to increases in certain kinds of loads. This scaling may occur automatically based on monitoring of load, and may also be triggered manually in anticipation of load increases. To illustrate, if an increasing number of export tasks (e.g., publish tasks) are observed (e.g., based on percentage of busy vs. idle time), more virtual machines that include instances of the export service 110 and/or an export worker 1748 may dynamically be instantiated to service the demand. Conversely, if an administrator of the system 1700 anticipates export volume (e.g., publish volume) to increase, the administrator may manually initialize additional virtual machines that include instances of the export service 110 and/or the export worker 1748. When export volume decreases, the virtual machines may be automatically (e.g., based on percentage of busy vs. idle time) or manually scaled down.

In the example of FIG. 17, a first tier of services includes synchronous "request-response" remote procedure call (RPC) services and a second tier includes asynchronous "worker" services. A synchronous RPC service may receive first data from a requestor, perform one or more processing functions, and return second data to the requestor. Such synchronous request-response services may be used for tasks that can be completed relatively quickly, e.g., in three seconds or less, because in some examples a requestor (e.g., a web browser or mobile app) may block while waiting for a response. Conversely, the asynchronous worker services of the second tier may be used for background tasks and other tasks that cannot or may not be completed relatively quickly.

In FIG. 17, the first tier includes a first scale group 1722 (designated "A"), a second scale group 1740 (designated "G"), and a third scale group 1741 (designated "E"). The first scale group 1722 includes a billing RPC service 1708, the export service 110, an import RPC service 1712, a license RPC service 1714, the media service 116, a review RPC service 1718, and a share RPC service 1720. To illustrate, a virtual machine corresponding to the first scale group 1722 may execute the illustrated RPC services. The billing RPC service 1708 may be configured to perform synchronous billing tasks (e.g., checking account balance). The export service 110 may be used to perform synchronous graphic design export tasks (e.g., publishing a design). The import RPC service 1712 may be configured to enable user importing of media assets for use in graphic design creation/editing. The license RPC service 1714 may be configured to enforce image licenses (e.g., one-time-use licenses). The media service 116 may be configured to track and catalog media assets available via the system 1700, including but not limited to user-uploaded and/or library images, layouts, fonts, etc. The review RPC service 1718 may be configured to facilitate acceptance of contributor media (e.g., uploading of media assets by authorized contributors of the graphic design website). The share RPC service 1720 may enable sharing of graphic designs with other users, such as via social media accounts.

The second scale group 1740 includes a comment RPC service 1724, a document RPC service 1726, a folder RPC service 1728, a notification RPC service 1730, a print RPC service 1732, a profile RPC service 1734, a search RPC service 1736, and a social RPC service 1738. The comment RPC service 1724 may enable users to comment on graphic designs in comment threads. The document RPC service 1726 may enable the core design creation, design updating, and design deletion functionality of the graphic design website. The folder RPC service 1728 may enable navigating into and out of different folders associated with a user's account. The notification RPC service 1730 may enable generating and serving notifications to users via the graphic design website (e.g., when a user's design is "liked" or commented on). In some aspects, multiple such notifications may be coalesced into an e-mail that is sent to an e-mail address of the user or that is shown on a pop-up when the user accesses the graphic design website. The print RPC service 1732 may be a format service that enables sending a graphic design to a third-party printer, for example to be printed and then delivered to a physical mailing address of the user. The profile RPC service 1734 may enable users to manage their graphic design website account. The search RPC service 1736 may enable searching for images, layouts, designs, etc. The social RPC service 1738 may enable users to perform social networking engagement on the graphic design website (e.g., "follow" another user, "like" another user's design, etc.) and may generate "feeds" of designs created by followed users. The third scale group 1741 includes a compute RPC service 1743 that may be dedicated for performing certain fast high-CPU-utilization operations, such as hashing and solving of passwords.

The second tier of services in FIG. 17 includes a fourth scale group 1758 (designated "D"), a fifth scale group 1764 (designated "F"), a sixth scale group 1768 (designated "C"), a seventh scale group 1776 (designated "H"), and an eighth scale group 1772 (designated "B"). The fourth scale group 1758 includes a billing worker 1744, a document worker 1746, an export worker 1748, a folder worker 1750, a search worker 1752, a share worker 1754, and a social worker 1756. The fifth scale group 1764 includes a low priority import worker 1760 and a review worker 1762. The sixth scale group 1768 includes a high priority import worker 1766. The seventh scale group 1776 includes a low priority export worker 1774. The eighth scale group 1772 includes a medium/high priority export worker 1770. In illustrative aspects, the asynchronous worker services in FIG. 17 may perform longer and/or more complex versions of the operations performed by the corresponding RPC services of FIG. 17. In a particular implementation, the priority designations shown in FIG. 17 (e.g., "low," "medium," and "high") correspond to an amount of dedicated processing resources. "High" priority may be used for jobs that are triggered by user actions whereas "medium" or "low" priority may be used for jobs that are not triggered by user actions (e.g., background jobs).

It is to be understood that the various services and groupings thereof shown in FIG. 17 is for illustration only and is not to be considered limiting. In alternative aspects, more, fewer, and/or different services may be present in the system. Moreover, a different grouping of services into different scale groups than shown in FIG. 17 may be used. In some aspects, each of the scale groups shown in FIG. 17 corresponds to a virtual hardware instance, i.e., a virtual machine running at a cloud services provider. Thus, at any given time, there may be one or more active/executing instances of each of the scale groups, and the specific numbers of active/executing virtual machine instances may dynamically change based on the overall workload being managed by the load balancers 1706. Coordination and configuration of the various instances, including communication between instances and/or services executed therein, may be managed by a coordination tool 1705, which may itself be a cloud-based system.

During operation, the synchronous RPC services of the first tier may be configured to communicate with the asynchronous workers' services of the second tier via the message queues 1742 and may utilize the asynchronous workers to perform time-consuming tasks. For example, the export service 110 may receive a request that a user wants to export a graphical design to a PDF format. The export service 110 may push a corresponding work request into the message queues 1742. An export worker (e.g., the medium/high priority export worker 1770) may respond to the work request by rendering the graphical design to PDF. The PDF or (a link to the PDF stored in a cloud storage system) may then be passed back to the requesting user. An export worker may correspond to a format service. For example, an export worker may include the HTML format service 132, the PDF format service 134, the image format service 146, the web format service 186, the animation format service 187, the presentation format service 189 of FIG. 1, one or more additional format services, or a combination thereof. As another example, the folder RPC service 1728 may receive a request indicating that a user wants to share a folder of graphic designs with another user. The folder RPC service 1728 may use the message queues 1742 to request that the folder worker 1750 set the corresponding permissions on the folder and on each of the items in that folder. As yet another example, asynchronous workers may be used to perform routine background tasks in the system 1700, such as daily verification of subscription levels.

During certain operations at the system 1700, the illustrated services may access one or more databases or data stores. For example, the document database 1784 may store files corresponding to user-created graphic designs and the media database 185 may store image uploads, fonts, and layouts that are accessible via the graphic design website. In an illustrative aspect, the document database 1784 may be accessed by the document worker 1746 when a user opens or saves a graphic design. In another illustrative aspect, the media database 185 may be accessed by the media service 116 when a user uploads or retrieves an image, a layout, or a font.

The system 1700 may also include one or more of a license database 1786, a share database 1787, the export database 1788, a profile database 1789, or a social database 1790. The license database 1786 may be used by the license RPC service 1714 to track licenses (e.g., one-time-use licenses for images) that have been acquired by a user. The share database 1787 may be used by the share RPC service 1720 or the share worker 1754 to manage sharing of graphic designs with other users (e.g., via social network(s)). The export database 1788 may be used by the export service 110, the export worker 1748, the low priority export worker 1774, or the medium/high priority export worker 1770 to track user exports of their graphic designs into different output formats. The profile database 1789 may support searching for user profiles based on different criteria. The social database 1790 may support social media aspects of the graphic design website.

The system 1700 may also include databases or data stores that support search functionality. For example, a media search database 1791 may be accessed by the search RPC service 1736 or the search worker 1752 when a user searches for images, layouts, or fonts. As another example, a profile search database 1792 may be accessed by the profile RPC service 1734 when a user edits the profile information associated with their account. As yet another example, a document search database 1793 may be accessed by the document worker 1746 when a user searches for a previously saved graphic design.

Certain operations at the system 1700 may involve accessing "external" services that are not part of the core service oriented platform of the graphic design website. Examples of such external services may include, but are not limited to, an analytics service 1778, a metrics service 1779, a billing service 1780, an e-mail service 1781, an open authorization (OAuth) service 1782, or a logging service 1783. The analytics service 1778 may receive analytics events (e.g., messages) each time a user performs an action on the graphic design website, and may enable per-user and macro level analytics of graphic design website workflow, operations, and performance. The metrics service 1779 may collect and provide performance information regarding the various components of the system 1700. The billing service 1780 may interface to one or more external payment providers, such as for credit card processing, mobile payment processing, etc. The e-mail service 1781 may enable generating and/or sending e-mails to users (e.g., for notifications, password reset, etc.). The OAuth service 1782 may enable federated logins to the graphic design website using social network credentials and may also support authentication with certain publish endpoints. The logging service 1783 may index events/messages that are generated by the components of the system 1700 for later diagnostic searching.

One example of an operation that may be supported by the system 1700 is logging in to the graphic design website via an Internet browser or a mobile app. A login request may be received by the web front end 1702 from the Internet browser or mobile app. The login request may be routed by the load balancers 1706 to an instance of the profile RPC service 1734, which may "look up" the user in the profile database 1789 and may authenticate the user (federated social networking login may involve the OAuth service 1782). Once the user is authenticated, the graphic design website may load a custom homepage for the user, which may include operations being performed by an instance of the folder RPC service 1728, the document worker 1746, etc. The custom homepage may then be returned to the user's Internet browser or mobile app.

Another example of an operation that may be supported by the system 1700 is starting a new design or opening an existing design. When a user clicks on a new design template, the web front end 1702 may provide the user's Internet browser or mobile application a graphical design interface (e.g., HTML, code) that is executable to edit the new or existing design. In the case of loading an existing design, the document RPC service 1726 and/or the document worker 1746 may access the document database 1784 to retrieve the existing design, and the media service 116 may load media assets that are included in the design from the media database 185.

Another example of an operation that may be supported by the system 1700 is when a user updates a design using the graphical design interface served by the graphic design website. As the user updates the design, the updates may be processed by the document RPC service 1726 and/or the document worker 1746. For example, the service(s) may process image or text movement, insertion, deletion, resizing, recoloring, etc.

Another example of an operation that may be supported by the system 1700 is when a user imports an image. In this case, the import RPC service 1712 and/or one of the import workers 1760, 1766 may receive a user-uploaded image, process the image, and integrate the image into the media database 185 for subsequent retrieval by the media service 116.

Another example of an operation that may be supported by the system 1700 is when a user applies a layout to a design. In this case, the media search database 1791 may provide via the media service 116, media assets corresponding to the layout. The insertion of the media assets into the design may then be processed by the document RPC service 1726 and/or the document worker 1746 as an update to the user's design.

Another example of an operation that may be supported by the system 1700 is when a user searches for a media asset and then drags-and-drops the media asset into a design. For example, when a user enters a search query "dog," the search RPC service 1736 and/or the search worker 1752 may access the media search database 1791 to retrieve search results for "dog." The search results may be presented by the user's Internet browser or mobile app. When the user adds a particular search result, e.g., a particular image of a dog, to their design, the document RPC service 1726 or the document worker 1746 may process the corresponding update to the design.

Figure 18:
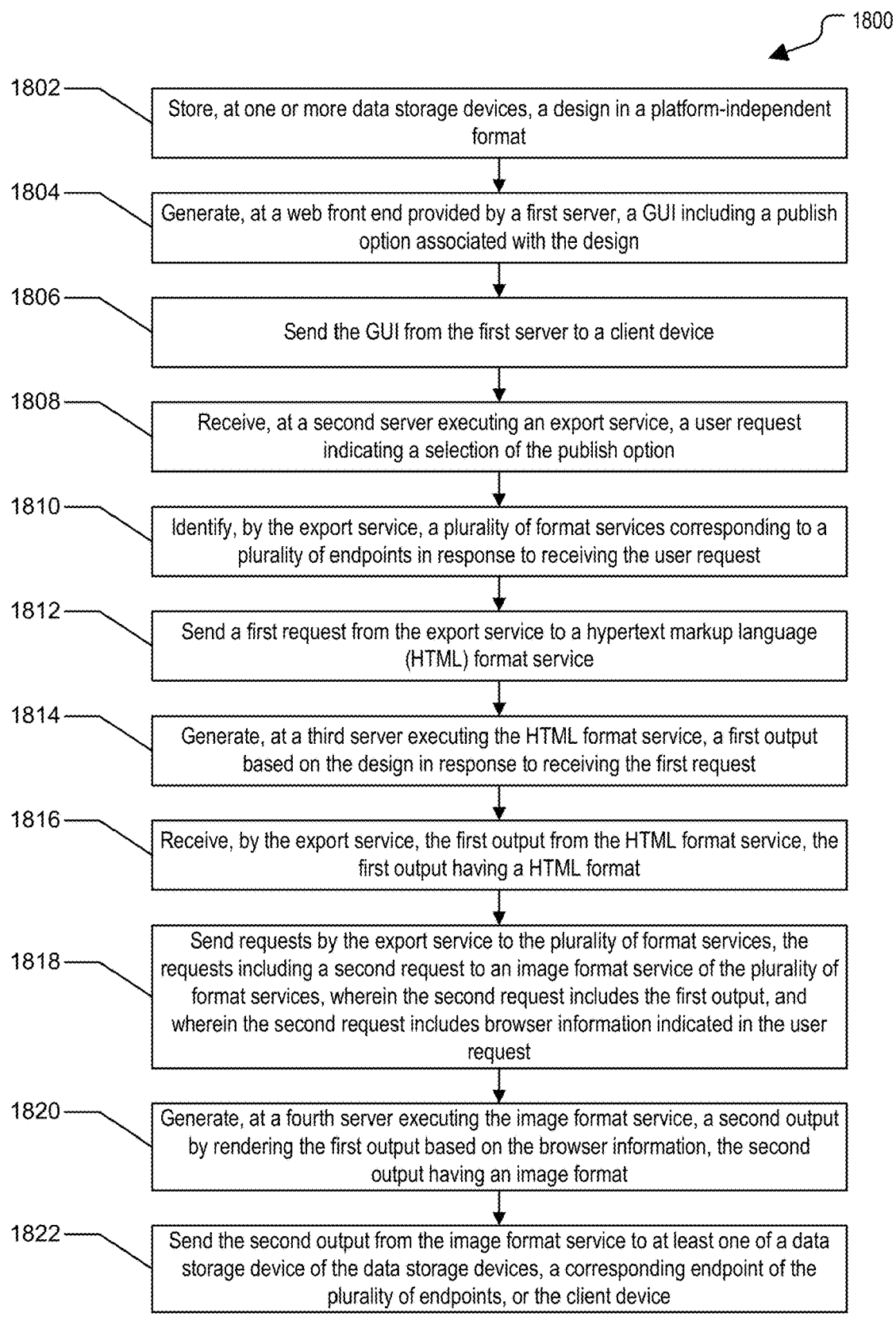
FIG. 18 illustrates a particular example of a method of publishing a design.

In a particular aspect, the system 1700 may support publishing of a design. For example, a user may select one or more publish options to publish a design, as described with reference to the preceding FIGS. In some aspects, component(s) of the system 1700 (and/or the system 100) may perform a method 1800 of FIG. 18, a method 1900 of FIG. 19, or a combination thereof, to publish a design.

The method 1800 includes storing, at one or more data storage devices, a design in a platform-independent format, at 1802. For example, referring to FIG. 17, the document database 1784 may store a design (e.g., the design 103 of FIG. 1) in a platform-independent format, such as a JSON format.

The method 1800 also includes generating, at a web front end provided by a first server, a GUI including a publish option associated with the design, at 1804. For example, the web front end 1702 executed by a first server may generate a GUI that includes a publish option associated with the design 103 of FIG. 1. The GUI may include the GUI 205, the GUI 305, the GUI 405, the GUI 505, the GUI 605, the GUI 705, the GUI 805, the GUI 905, the GUI 1005, the GUI 1105, the GUI 1205, the GUI 1305, the GUI 1403, the GUI 1505, the GUI 1605, or a combination thereof.

The method 1800 further includes sending the GUI from the first server to a client device, at 1806. For example, the first server, the web front end 1702, and/or the CDN 101, may send the GUI to the client device 192. While the user edits the design 103 on the graphic design website, the document RPC service 1726 may save the edits to the design. The user may select the publish option to publish the design 103, as described with reference to FIGS. 1-17. The client device 192 may generate the user request 111 in response to receiving a selection of the publish option. The client device 192 may send the user request 111, the browser information 113, the endpoint ID(s) 117, the endpoint settings 119, or a combination thereof, to the export service 110 of FIG. 1, as described with reference to FIGS. 1-17.

The method 1800 also includes receiving, at a second server executing an export service, a user request indicating a selection of the publish option, at 1808. For example, a second server may execute the export service 110 and may receive the user request 111 from the client device 192. The second server, the export service 110, or both, may also receive the browser information 113, the endpoint ID(s) 117, the endpoint settings 119, or a combination thereof, from the client device 192. The user request 111 may indicate a selection of the publish option.

The method 1800 also includes identifying, by the export service, a plurality of format services corresponding to a plurality of endpoints in response to receiving the user request, at 1810. For example, the export service 110 may, in response to receiving the user request 111, identify at least two of the endpoints 172, 174, 176 corresponding to the endpoint ID(s) 117, as described with reference to FIG. 1. The export service 110 may identify at least two of the format services 132, 134, 146, 186, 187, 189 corresponding to the identified endpoints.

The method 1800 further includes sending a first request from the export service to a hypertext markup language (HTML) format service, at 1812. For example, the export service 110 may send a first request to the HTML format service 132. To illustrate, the export service 110 may add the first request to the message queues 1742. The first request may be for an export worker configured to provide the HTML format service 132. The export worker may include the export worker 1748, the low priority export worker 1774, or the medium/high priority export worker 1770.

The method 1800 also includes generating, at a third server executing the HTML format service, a first output based on the design in response to receiving the first request, at 1814. For example, a third server may execute the HTML format service 132 and may generate the HTML output 151 in response to receiving the first request. The HTML output 151 may be based on the design 103.

The method 1800 further includes receiving, by the export service, the first output from the HTML format service, at 1816. For example, the export service 110 may receive the HTML output 151 from the HTML format service 132.

The method 1800 also includes sending requests by the export service to the plurality of format services, at 1818. For example, the export service 110 may send requests to the at least two of the format services 132, 134, 146, 186, 187, 189. To illustrate, the export service 110 may send a second request to the image format service 146 and a third request to the web format service 186. Sending the second request and the third request may include adding the second request and the third request to the message queues 1742. The second request may include (e.g., indicate) the HTML output 151 and/or the browser information 113.

The method 1800 further includes generating, at a fourth server executing the image format service, a second output by rendering the first output based on the browser information, at 1820. For example, a fourth server may execute the image format service 146 and may generate the image output 153 by rendering the HTML output 151 based on the browser information 113, as described with reference to FIG. 1.

The method 1800 also includes sending the second output from the image format service to at least one of a data storage device, a corresponding endpoint of the plurality of endpoints, or the client device, at 1822. For example, the image format service 146 may send the image output 153 to at least one of the export database 1788, the endpoint 172, the endpoint 174, the endpoint 176, or the client device 192.

The method 1800 thus enables publishing a design (e.g., the design 103) to multiple endpoints. Although a first format of a first output to a first endpoint may differ from a second format of a second output to a second endpoint, the first output may have a similar look-and-feel to the second output, and both outputs may have the same look-and-feel as the design 103 as viewed at the computing device 192 by virtue of using the browser information 113 during the publishing process.

Figure 19:
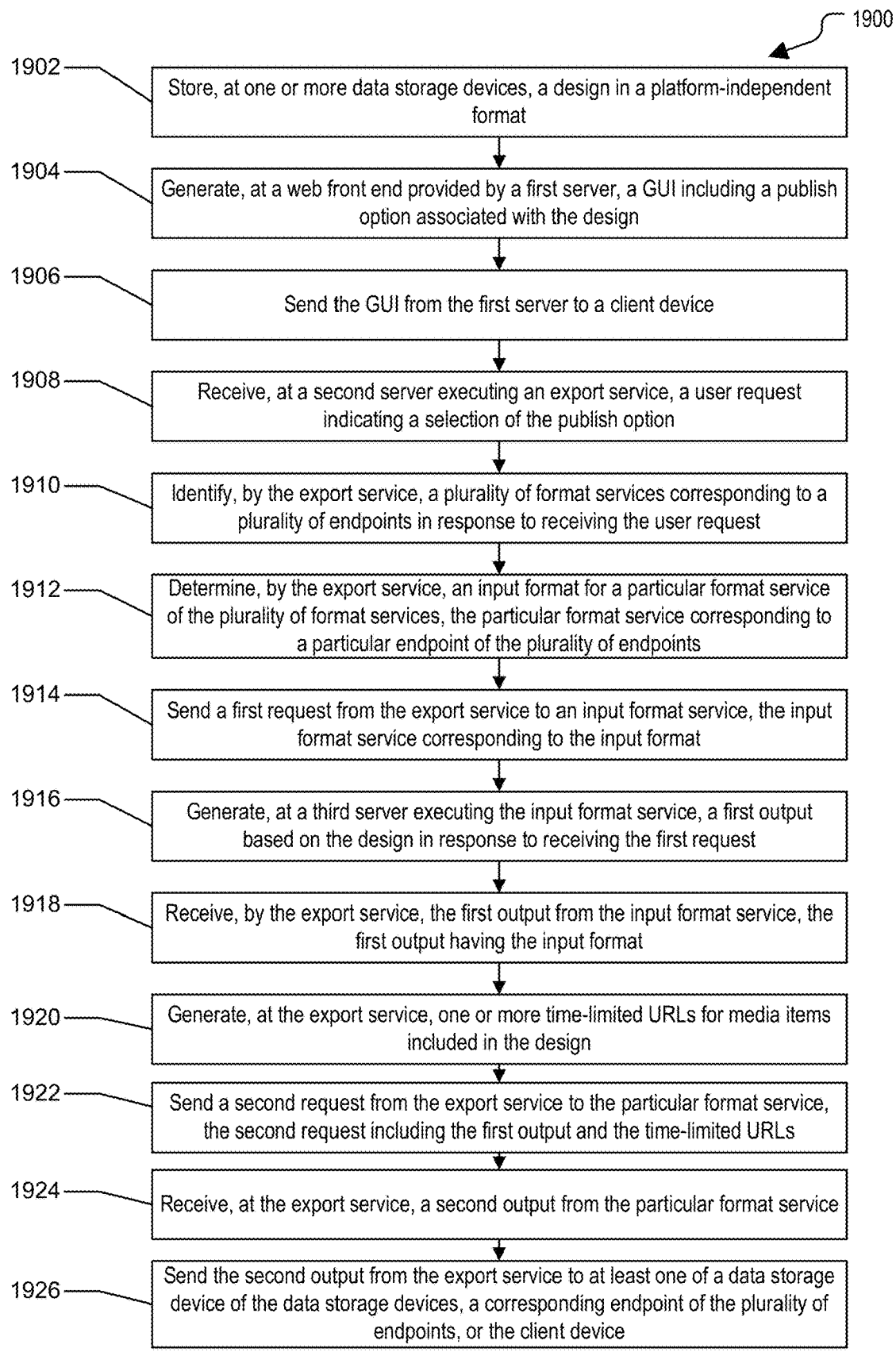
FIG. 19 illustrates another particular example of a method of publishing a design.

Referring now to FIG. 19, the method 1900 includes storing, at one or more data storage devices, a design in a platform-independent format, at 1902. For example, referring to FIG. 17, the document database 1784 may store a design (e.g., the design 103 of FIG. 1) in a platform-independent format, such as a JSON format.

The method 1900 also includes generating, at a web front end provided by a first server, a GUI including a publish option associated with the design, at 1904. For example, the web front end 1702 executed by a first server may generate a GUI that includes a publish option associated with the design 103 of FIG. 1. The GUI may include the GUI 205, the GUI 305, the GUI 405, the GUI 505, the GUI 605, the GUI 705, the GUI 805, the GUI 905, the GUI 1005, the GUI

1105, the GUI 1205, the GUI 1305, the GUI 1403, the GUI 1505, the GUI 1605, or a combination thereof.

The method 1900 further includes sending the GUI from the first server to a client device, at 1906. For example, the first server, the web front end 1702, and/or the CDN 101, may send the GUI to the client device 192. The user may select the publish option to publish the design 103, as described with reference to FIGS. 1-17. The client device 192 may send the user request 111, the browser information 113, the endpoint ID(s) 117, the endpoint settings 119, or a combination thereof, to the export service 110 of FIG. 1, as described with reference to FIGS. 1-17.

The method 1900 also includes receiving, at a second server executing an export service, a user request indicating a selection of the publish option, at 1908. For example, a second server may execute the export service 110 and may receive the user request 111 from the client device 192. The second server, the export service 110, or both, may also receive the browser information 113, the endpoint ID(s) 117, the endpoint settings 119, or a combination thereof, from the client device 192. The user request 111 may indicate a selection of the publish option.

The method 1900 also includes identifying, by the export service, a plurality of format services corresponding to a plurality of endpoints in response to receiving the user request, at 1910. For example, the export service 110 may, in response to receiving the user request 111, identify at least two of the endpoints 172, 174, 176 corresponding to the endpoint ID(s) 117, as described with reference to FIG. 1. The export service 110 may identify at least two of the format services 132, 134, 146, 186, 187, 189 corresponding to the identified endpoints. For example, the export service 110 may identify the web format service 186 corresponding to the endpoint 174 and the presentation format service 189 corresponding to the endpoint 172.

The method 1900 further includes determining, by the export service, an input format for a particular format service of the plurality of format services, at 1912. For example, the export service 110 may determine an input format (e.g., an HTML format) for the web format service 186. The web format service 186 corresponds to the endpoint 174.

The method 1900 also includes sending a first request from the export service to an input format service, at 1914. For example, the export service 110 may send a first request to the HTML format service 132. The HTML format service 132 may correspond to the input format (e.g., an HTML format). For example, the HTML format service 132 is configured to convert the design 103 to the HTML output 151.

The method 1900 further includes generating, at a third server executing the input format service, a first output based on the design in response to receiving the first request, at 1914. For example, a third server may execute the HTML format service 132 and may generate the HTML output 151 in response to receiving the first request. The HTML output 151 may be based on the design 103.

The method 1900 also includes receiving, by the export service, the first output from the input format service, at 1918. For example, the export service 110 may receive the HTML output 151 from the HTML format service 132.

The method 1900 further includes generating, at the export service, one or more time-limited URLs for media items included in the design, at 1920. For example, the export service 110 may generate the media URL 165 for the media item 163 included in the design 103. The media URL 165 may be a time-limited URL, as described with reference to FIG. 1.

The method 1900 also includes sending a second request from the export service to the particular format service, at 1922. For example, the export service 110 may send a second request to the web format service 186. The second request may include the HTML output 151 and the one or more media URLs (e.g., the media URL 165).

The method 1900 further includes receiving, at the export service, a second output from the particular format service, at 1924. For example, the export service 110 may receive the web output 181 from the web format service 186.

The method 1900 also includes sending the second output from the export service to at least one of a data storage device of the data storage devices, a corresponding endpoint of the plurality of endpoints, or the client device, at 1926. For example, the export service 110 may send the web output 181 to at least one of the export database 1788, the endpoint 172, the endpoint 174, the endpoint 176, or the client device 192.

The method 1900 thus enables publishing a design (e.g., the design 103) by daisy-chaining format services. A new type of endpoint may be supported by the export service 110 with little or no change in the input format services 191 by the addition of an output format service to the output format services 194 that corresponds to the new type of endpoint and supports an input format corresponding to at least one of the input format services 191.

Methods and devices that may implement aspect(s) of the various features of the present disclosure have been described with reference to the drawings. The drawings and the associated descriptions are provided to illustrate aspects and not to limit the scope of the present disclosure. Reference to any specific aspect, aspect, or implementation is intended to indicate that a particular feature, structure, or characteristic described in connection therewith is included in at least an aspect, aspect, or implementation of the present disclosure. However, the various uses of the terms "aspect," "aspect," or "implementation" are not necessarily all referring to the same single aspect, aspect, or implementation.

In a particular aspect, a method includes storing, at one or more data storage devices, a design in a platform-independent format. The method also includes generating, at a web front end, a GUI including a publish option associated with the design. The method further includes sending the GUI to a client device. The method also includes receiving a user request indicating a selection of the publish option, and, in response to receiving the user request, generating first output based on the design, the first output having a HTML format. The method further includes identifying a rendering engine based on browser information associated with the client device and generating second output by rendering the first output at the rendering engine, the second output having an image format. The method also includes sending the second output to at least one of a data storage device of the data storage devices, a publishing endpoint, or the client device.

In another particular aspect, a system includes one or more data storage devices configured to store a design in a platform-independent format. The system also includes a first server configured to provide a web front end. The web front end is configured to generate a GUI including a publish option, and to send the GUI to a client device. The system further includes a second server configured to execute an export service. The export service is configured, in response to receiving a user request indicating a selection of the publish option, to identify a plurality of format services corresponding to a plurality of endpoints and to send requests to the plurality of format services. The requests include a first request to a first format service of the plurality of format services. The system also includes a third server configured to instantiate and execute the first format service in response to the first request. The first format service is configured to generate a first output having a first format and corresponding to the design and to send the first output to at least one of a data storage device of the data storage devices, a corresponding endpoint of the plurality of endpoints, or the client device.

In another particular aspect, a system includes one or more data storage devices configured to store a design in a platform-independent format. The system also includes a first server configured to provide a web front end. The web front end is configured to generate a GUI including a publish option associated with the design, and to send the GUI to a client device. The system further includes one or more additional servers configured to execute an export service. The export service is configured to receive a user request indicating a selection of the publish option, to identify a plurality of format services corresponding to a plurality of endpoints in response to receiving the user request, to send a first request to a HTML format service, to receive a first output from the HTML format service responsive to the first request, and to send requests to the plurality of format services. The requests include a second request to an image format service of the plurality of format services. The HTML format service is configured to generate the first output based on the design in response to receiving the first request. The image format service is configured to generate a second output by rendering the first output based on the browser information associated with the client device, the second output having an image format, and to send the second output to at least one of a data storage device of the data storage devices, a corresponding endpoint of the plurality of endpoints, or the client device.

In the foregoing description, specific details are given to provide a thorough understanding of the present disclosure. However, it will be understood by one of ordinary skill in the art that the present disclosure can be practiced without these specific details. Well-known structures and techniques may not be shown in detail, in order to avoid obscuring the illustrated aspects. For example, algorithms may be shown in block diagrams.

It is noted that aspects may be described as a process that is depicted as a flowchart, a flow diagram, a structure diagram, or a block diagram. Although a flowchart may describe operations as a sequential process, many of the operations can be performed in parallel or at least partially concurrently. In addition, the order of the operations can be rearranged. A process is terminated when its operations are completed. A process can correspond to a method, a function, a procedure, a subroutine, a subprogram, etc. When a process corresponds to a function, its termination corresponds to a return of the function to the calling function or the main function.

Moreover, storage may represent one or more devices that store data, including but not limited to random access memory (RAM), flash memory, read-only memory (ROM), programmable read-only memory (PROM), erasable programmable read-only memory (EPROM), electrically erasable programmable read-only memory (EEPROM), registers, a hard disk, a removable disk, a disc-based memory (e.g., compact disc read-only memory (CD-ROM)), a flash memory device, and/or other computer-readable or processor-readable media to store information. As used herein, a computer-readable or processor-readable storage medium/device is not a signal.

Furthermore, aspects can be implemented by hardware, software, firmware, middleware, microcode, or any combination thereof. When implemented in software, firmware, middleware or microcode, program code or code segments to perform the tasks can be stored in a memory or other storage. One or more than one processor can perform tasks in series, distributed, concurrently, or in parallel. In some examples, a virtual computer system can be constructed to implement one or more of the methods or functionality as described herein. A code segment can represent a procedure, a function, a subprogram, a program, a routine, a subroutine, a module, a software package, a class, or a combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted through a suitable means including memory sharing, message passing, token passing, network transmission, etc.

Although the present disclosure has been described with a degree of particularity, it is understood that the present disclosure has been made by way of example and that other versions are possible. As various changes could be made in the above description without departing from the scope of the disclosure, it is intended that all matter contained in the above description or shown in the accompanying drawings shall be illustrative and not used in a limiting sense.

All features disclosed in the specification, including the claims, abstract, and drawings, and all the steps in any method or process disclosed, can be combined in any combination, except combinations where at least some of such features and/or steps are mutually exclusive. Each feature disclosed in the specification, including the claims, abstract, and drawings, can be replaced by alternative features serving the same, equivalent or similar purpose, unless expressly stated otherwise.

Thus, unless expressly stated otherwise, each feature disclosed is one example only of a generic series of equivalent or similar features. The above-disclosed subject matter is to be considered illustrative, and not restrictive, and the appended claims are intended to cover all such modifications, enhancements, and other aspects, which fall within the true scope of the present disclosure. Thus, to the maximum extent allowed by law, the scope of the present disclosure is to be determined by the broadest permissible interpretation of the following claims and their equivalents, and shall not be restricted or limited by the foregoing description.

What is claimed is:

1. A method comprising:
    storing, at one or more data storage devices, a design in a platform-independent format;
    generating, at a web front end, a graphical user interface (GUI) including a publish option associated with the design;
    sending the GUI to a client device;
    receiving a user request indicating a selection of the publish option;
    in response to receiving the user request, generating a first output based on the design, the first output having a HTML format;
    identifying a rendering engine based on browser information associated with the client device, generating a second output by rendering the first output at the rendering engine, the second output having an image format; and sending the second output to at least one of a data storage device of the data storage devices, a publishing endpoint, or the client device.

2. The method of claim 1, wherein the browser information is associated with a make of the client device, a model of the client device, an operating system executed by the client device, a version of a browser executed by the client device, a version of a browser plug-in or another application executed by the client device, or any combination thereof.

3. The method of claim 1, further comprising executing an export service that is configured to determine that the publishing endpoint corresponds to a particular sequence of format services that includes a HTML format service and an image format service.

4. The method of claim 3, further comprising:
executing a first virtual machine including the export service; and
executing a second virtual machine including the HTML format service.

5. The method of claim 3, further comprising, in response to detecting a first request from the export service, sending a message from a load balancer to a server requesting instantiation of the HTML format service.

6. The method of claim 1, wherein the publishing endpoint includes at least one of a website, a social network site, an application, or the client device.

7. The method of claim 1, wherein the platform-independent format includes one or more key-value pairs representative of the design.

8. The method of claim 7, wherein generating first output includes converting the one or more key-value pairs to HTML elements.

9. The method of claim 1, wherein the image format of the second output is a raster image format.

10. The method of claim 1, wherein the image format of the second output is a JPG format or PNG format.

11. A system comprising:
one or more data storage devices configured to store a design in a platform-independent format;
a first server configured to provide a web front end, the web front end configured to:
generate a graphical user interface (GUI) including a publish option associated with the design; and
send the GUI to a client device; and
one or more additional servers configured to execute an export service, the export service configured to:
receive a user request indicating a selection of the publish option;
identify a plurality of format services corresponding to a plurality of endpoints in response to receiving the user request;
send a first request to a hypertext markup language (HTML) format service;
receive a first output from the HTML format service responsive to the first request, the first output having a HTML format; and
send requests to the plurality of format services, the requests including a second request to an image format service of the plurality of format services;
wherein the HTML format service is configured to generate the first output based on the design in response to receiving the first request, and
wherein the image format service is configured to:
generate a second output by rendering the first output based on browser information associated with the client device, the second output having an image format; and
send the second output to at least one of a data storage device of the data storage devices, a corresponding endpoint of the plurality of endpoints, or the client device.

12. The system of claim 11, further comprising a load balancer configured to determine whether to request instantiation of the HTML format service.

13. The system of claim 11, further comprising a load balancer configured to determine whether to request instantiation of the image format service.

14. The system of claim 11, wherein the one or more data storage devices are further configured to store authorization data associated with the endpoint, wherein the first request includes the authorization data.

15. The system of claim 11, wherein the image format of the second output is a raster image format.

16. The system of claim 11, wherein the image format of the second output is a JPG format or PNG format.

* * * * *